(12) United States Patent
Lee

(10) Patent No.: US 10,545,675 B2
(45) Date of Patent: Jan. 28, 2020

(54) MEMORY SYSTEM INCLUDING MULTI-INTERFACES

(71) Applicant: SK hynix Inc., Gyeonggi-do (KR)

(72) Inventor: Jun-Seo Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/476,557

(22) Filed: Mar. 31, 2017

(65) Prior Publication Data

US 2018/0052601 A1 Feb. 22, 2018

(30) Foreign Application Priority Data

Aug. 22, 2016 (KR) .................. 10-2016-0106072

(51) Int. Cl.
*G06F 3/06* (2006.01)
*G06F 13/42* (2006.01)
*G11C 7/10* (2006.01)
*G06F 12/00* (2006.01)

(52) U.S. Cl.
CPC .............. *G06F 3/061* (2013.01); *G06F 3/06* (2013.01); *G06F 3/0655* (2013.01); *G06F 3/0688* (2013.01); *G06F 13/4282* (2013.01); *G06F 12/00* (2013.01); *G06F 2213/0026* (2013.01)

(58) Field of Classification Search
CPC .. G06F 12/00; G06F 3/0611; G06F 15/17331; G06F 3/06; G06F 12/02; G06F 12/06
See application file for complete search history.

(56) References Cited

U.S. PATENT DOCUMENTS

| | | | |
|---|---|---|---|
| 2005/0198434 A1* | 9/2005 | Uchiumi | G06F 3/0605 711/113 |
| 2009/0106492 A1* | 4/2009 | Muto | G06F 11/1076 711/114 |
| 2010/0023685 A1* | 1/2010 | Ikejiri | G06F 1/3221 711/114 |
| 2010/0191901 A1* | 7/2010 | Toyama | G06F 3/0613 711/103 |
| 2011/0099325 A1* | 4/2011 | Roh | G06F 3/0619 711/103 |
| 2014/0019672 A1* | 1/2014 | Harasawa | G06F 12/0246 711/103 |
| 2014/0281144 A1* | 9/2014 | Suzuki | G06F 12/0246 711/103 |
| 2015/0254003 A1* | 9/2015 | Lee | G06F 13/382 711/103 |
| 2015/0255130 A1 | 9/2015 | Lee et al. | |

* cited by examiner

*Primary Examiner* — Getente A Yimer
(74) *Attorney, Agent, or Firm* — IP & T Group LLP

(57) ABSTRACT

A memory system includes: a nonvolatile memory device including first and second storage regions; and a controller including first and second interfaces, the first interface being suitable for exchanging data between the first storage region and a host, and the second interface being suitable for exchanging data between the second storage region and the host.

20 Claims, 8 Drawing Sheets

MEMORY SYSTEM INCLUDING MULTI-INTERFACES

CROSS-REFERENCE TO RELATED APPLICATION

This U.S. non-provisional patent application claims priority under 35 U.S.C. § 119(a) to Korean Patent Application No. 10-2016-0106072 filed on Aug. 22, 2016 in the Korean Intellectual Property Office (KIPO), the disclosure of which is incorporated herein by reference in its entirety.

TECHNICAL FIELD

Exemplary embodiments relate generally to a semiconductor design technology, and more particularly, to a memory system including a nonvolatile memory device.

DISCUSSION OF THE RELATED ART

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having memory devices for data storage. The memory system may be used as a main memory device or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to an improved memory system including a nonvolatile memory device and at least two interfaces capable of exchanging data between the nonvolatile memory device and a host. The memory system may be used for various uses.

In an embodiment, a memory system may include: a nonvolatile memory device including first and second storage regions; and a controller including first and second interfaces, the first interface being suitable for exchanging data between the first storage region and a host, and the second interface being suitable for exchanging data between the second storage region and the host.

The controller may be further suitable for checking an in-use capacity of each of the first and second interfaces in a predetermined period, and for changing a capacity of each of the first and second storage regions in the nonvolatile memory device based on the checked in-use capacities of the first and second interfaces.

When a first size of first data inputted/outputted through the first interface in the predetermined period is larger by at least a predetermined size than a second size of second data inputted/outputted through the second interface in the predetermined period, the controller may increase the capacity of the first storage region in the nonvolatile memory device by a predetermined magnitude, and may decrease the capacity of the second storage region in the nonvolatile memory device, by the predetermined magnitude. When a first size of first data inputted/outputted through the first interface in the predetermined period is smaller by at least a predetermined size than a second size of second data inputted/outputted through the second interface in the predetermined period, the controller may decrease the capacity of the first storage region in the nonvolatile memory device by a predetermined magnitude, and may increase the capacity of the second storage region in the nonvolatile memory device by the predetermined magnitude. When a first size of first data inputted/outputted through the first interface in the predetermined period and a second size of second data inputted/outputted through the second interface in the predetermined period have a difference smaller than a predetermined size, the controller may retain the capacities of the first and second storage regions in the nonvolatile memory device to be the same as those determined before the predetermined period is entered.

When a first size of first data inputted/outputted through the first interface in the predetermined period is larger than a first reference size and a second size of second data inputted/outputted through the second interface in the predetermined period is smaller than a second reference size, the controller may increase the capacity of the first storage region in the nonvolatile memory device by a predetermined magnitude, and may decrease the capacity of the second storage region in the nonvolatile memory device, by the predetermined magnitude. When the first size of first data inputted/outputted through the first interface in the predetermined period is smaller than the first reference size and a second size of the second data inputted/outputted through the second interface in the predetermined period is larger than the second reference size, the controller may decrease the capacity of the first storage region in the nonvolatile memory device by the predetermined magnitude, and may increase the capacity of the second storage region in the nonvolatile memory device by the predetermined magnitude.

When the first size of first data inputted/outputted through the first interface in the predetermined period is larger than the first reference size and a second size of second data inputted/outputted through the second interface in the predetermined period is larger than the second reference size and in the case where the first size of the first data inputted/outputted through the first interface in the predetermined period is smaller than the first reference size and the second size of the second data inputted/outputted through the second interface in the predetermined period is smaller than the second reference size, the controller may retain the capacities of the first and second storage regions in the nonvolatile memory device to be the same as those determined before the predetermined period is entered.

A length of the predetermined period corresponds to a predetermined time interval, and the controller may repeatedly apply the predetermined period with a predetermined cycle from a time when power is supplied or every time a predetermined event occurs.

The controller may include: a clock generation unit suitable for generating a first and a second clock, the first clock having a relatively higher frequency than the second clock; and a transfer unit suitable for inputting/outputting output/input data of the first storage region to/from the host through the first interface which operates in response to the first clock, and inputting/outputting output/input data of the second storage region to/from the host through the second interface which operates in response to the second clock.

The controller may use the first storage region as a main memory device of the host, and uses the second storage region as a storage of the host.

The first interface may include a dual in-line memory module (DIMM) interface, and the second interface includes a PCI-express (peripheral component interconnect express: PCI-e) interface.

The nonvolatile memory device may include any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

In an embodiment, a memory system may include: a first nonvolatile memory device including a first storage region and a second storage region; a second nonvolatile memory device including a third storage region and a fourth storage region; and a controller including first and second interfaces for inputting/outputting data with respect to a host, and suitable for inputting/outputting data to be outputted/inputted from/to at least one storage region among the first to third storage regions, to/from the host, by using the first interface and inputting/outputting data to be outputted/inputted from/to at least one storage region among the second to fourth storage regions, to/from the host, by using the second interface.

The controller may check respective in-use capacities of the first and second interfaces in a predetermined period, and, depending on a checking result, may select whether each of the first to fourth storage regions will input/output data by using the first interface or the second interface.

When a size of data inputted/outputted through the first interface in the predetermined period is larger by at least a predetermined size than a size of data inputted/outputted through the second interface in the predetermined period, the controller may control at least two storage regions among the first to third storage regions to input/output data by using the first interface and controls at most two storage regions among the second to fourth storage regions to input/output data by using the second interface. When a size of data inputted/outputted through the first interface in the predetermined period is smaller by at least the predetermined size than a size of data inputted/outputted through the second interface in the predetermined period, the controller may control at most two storage regions among the first to third storage regions to input/output data by using the first interface and controls at least two storage regions among the second to fourth storage regions to input/output data by using the second interface. When a size of data inputted/outputted through the first interface in the predetermined period and a size of data inputted/outputted through the second interface in the predetermined period have a difference smaller than the predetermined size, the controller may control the first to fourth storage regions to use the first and second interfaces having been used to input/output data before the predetermined period is entered, as they are.

In the case where a size of data inputted/outputted through the first interface in the predetermined period is larger than a first reference size and a size of data inputted/outputted through the second interface in the predetermined period is smaller than a second reference size, the controller may control at least two storage regions among the first to third storage regions to input/output data by using the first interface and controls at most two storage regions among the second to fourth storage regions to input/output data by using the second interface. In the case where a size of data inputted/outputted through the first interface in the predetermined period is smaller than the first reference size and a size of data inputted/outputted through the second interface in the predetermined period is larger than the second reference size, the controller may control at most two storage regions among the first to third storage regions to input/output data by using the first interface and controls at least two storage regions among the second to fourth storage regions to input/output data by using the second interface.

When a size of data inputted/outputted through the first interface in the predetermined period is larger than the first reference size and a size of data inputted/outputted through the second interface in the predetermined period is larger than the second reference size and in the case where a size of data inputted/outputted through the first interface in the predetermined period is smaller than the first reference size and a size of data inputted/outputted through the second interface in the predetermined period is smaller than the second reference size, the controller may control the first to fourth storage regions to use the first and second interfaces having been used to input/output data before the predetermined period is entered, as they are.

A length of the predetermined period corresponds to a predetermined time interval, and the controller may repeatedly apply the predetermined period with a predetermined cycle from a time when power is supplied or every time a predetermined event occurs.

The controller may include: a clock generation unit suitable for generating a first clock and a second clock, the first clock having a relatively higher frequency than the second clock; and a transfer unit suitable for inputting/outputting data to be outputted/inputted from at least one storage region among the first to third storage regions, to/from the host, through the first interface which operates in response to the first clock, and inputting/outputting data to be outputted/inputted from at least one storage region among the second to fourth storage regions, to/from the host, through the second interface which operates in response to the second clock.

The controller may use at least one storage region among the first to third storage regions which uses the first interface, as a main memory device of the host, and may use at least one storage region among the second to fourth storage regions which uses the second interface, as a storage of the host.

The first interface may include a dual in-line memory module (DIMM) interface, and the second interface may include a PCI-express (peripheral component interconnect express: PCI-e) interface.

Each of the first and second nonvolatile memory devices may include any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
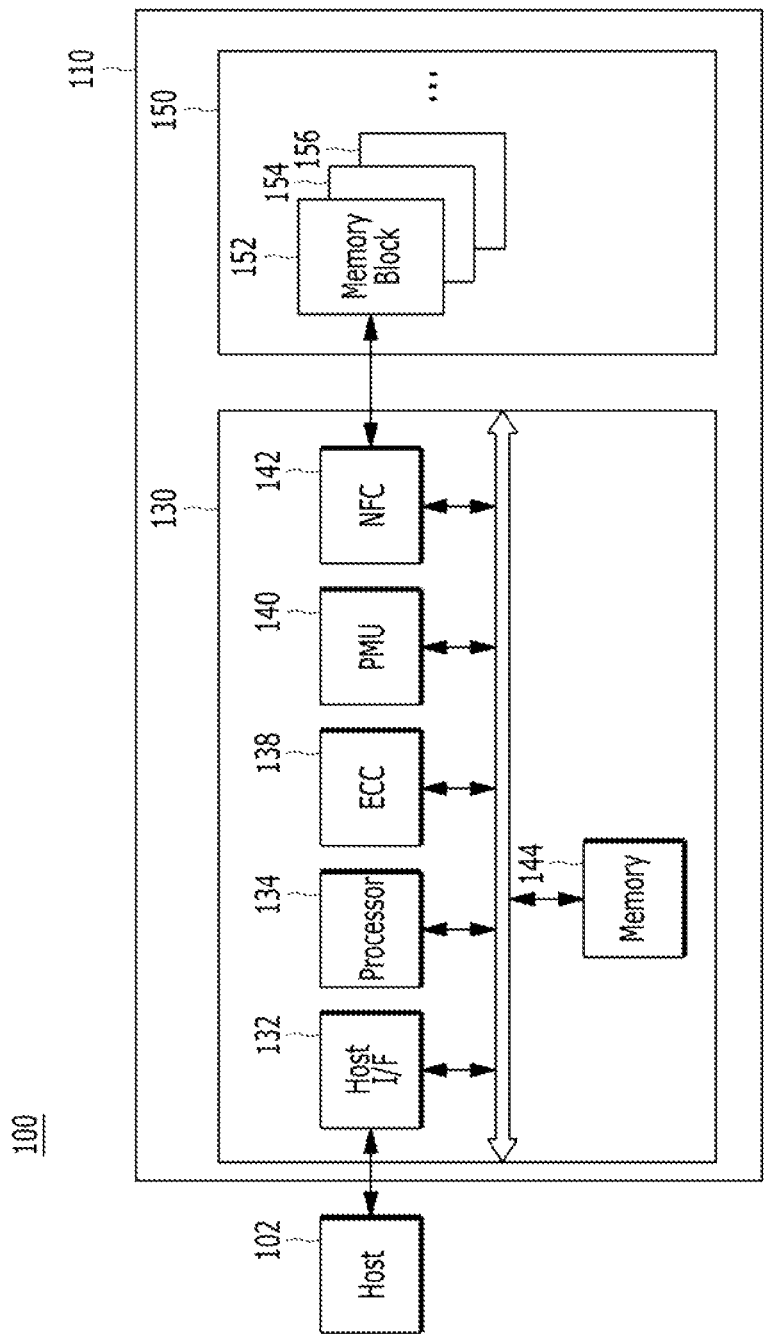
FIG. 1 is a diagram illustrating a data processing system including a semiconductor memory system, according to an exemplary embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an exemplary embodiment of the present invention.

Referring to FIG. 1, the data processing system 100 may include a host 102 and a memory system 110.

The host 102 may include, for example, a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a spin transfer torque random access memory (STT-RAM), a resistive RAM (RRAM) and a flash memory.

The memory system 110 may include a memory device 150 and a controller 130. The memory device 150 may store data to be accessed by the host 102, and the controller 130 may control data exchange between the memory device 150 and the host 102. Under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid-state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For instance, the memory system 110 may be configured as at least one component of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various other components for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or a three-dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 4.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than a threshold number of correctable error bits, and may output an error correction fail signal indicating failure in correcting the error bits.

The ECC unit 138 may perform an error correction operation based on a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail may seriously deteriorate the utilization efficiency of the memory device 150 having a 3D stack structure and the reliability of the memory system 100, and thus reliable bad block management may be required.

Figure 2:
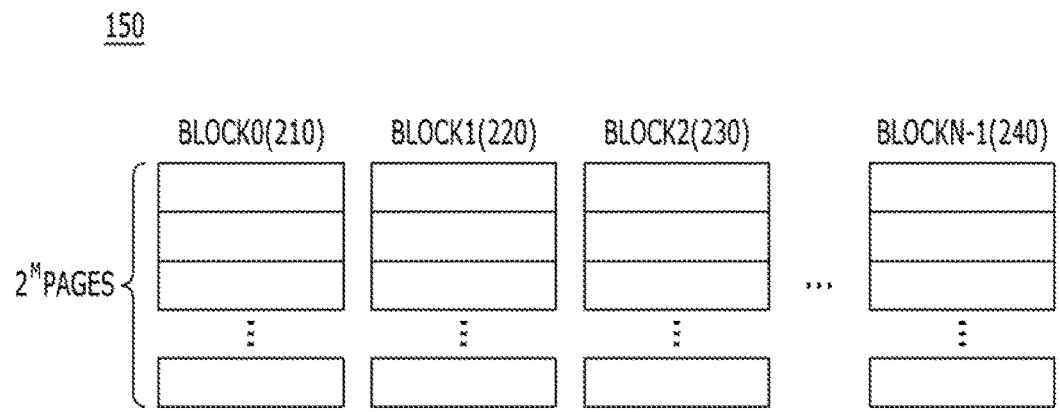
FIG. 2 is a diagram illustrating an example of a memory device employed in the memory system of FIG. 1.

FIG. 2 is a diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells electrically coupled to a word line.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be referred to, also, as a triple level cell (TLC) memory block.

Each of the memory blocks 210 to 240 may store the data provided from the host 102 during a write operation, and provide the stored data to the host 102 during a read operation.

Figure 3:
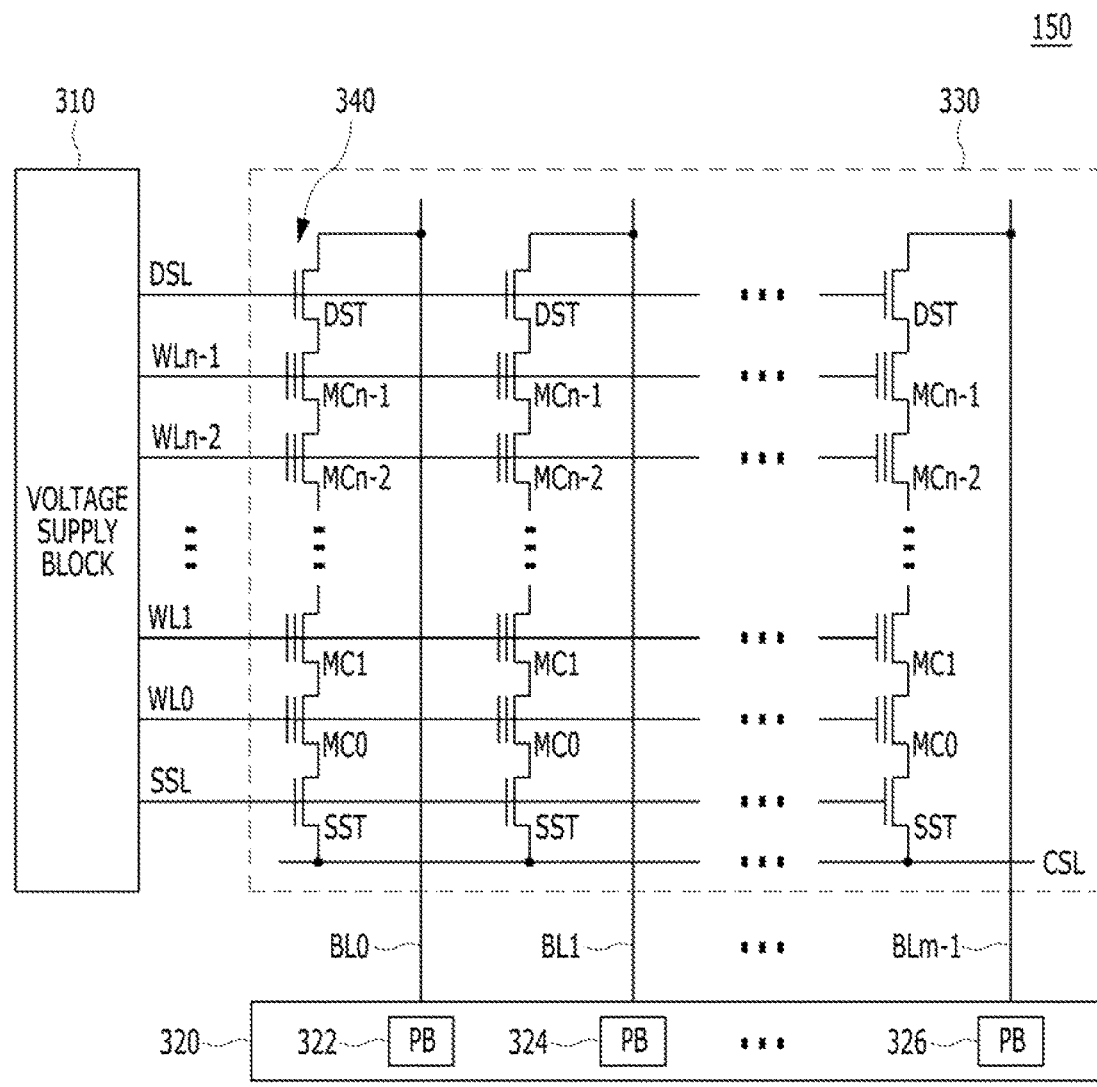
FIG. 3 is a circuit diagram illustrating a memory block in a memory device, according to an exemplary embodiment of the present invention.

FIG. 3 is a diagram illustrating a memory device 150 including the memory block shown in FIG. 2. FIG. 3 shows a configuration of a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor (i.e., string select transistor) DST and at least one source select transistor (i.e., ground select transistor) SST. A plurality of memory cell transistors MC0 to MCn-1 may be electrically coupled in series between the select transistors SST and DST. The respective memory cells MC0 to MCn-1 may be configured by multi-level cells (MLC) each of which stores data information of a plurality of bits. The cell strings 340 may be electrically coupled to the corresponding bit lines BL0 to BLm-1, respectively. For reference, in FIG. 3, 'DSL' may denote a string select line (i.e., a drain select line), 'SSL' may denote a ground select line (i.e., a source select line), and 'CSL' may denote a common source line.

While FIG. 3 shows, as an example, the memory block 330 which is configured by NAND flash memory cells, it is to be noted that the memory block 330 of the memory device 150 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers (PBs) 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN-1.

Figure 4:
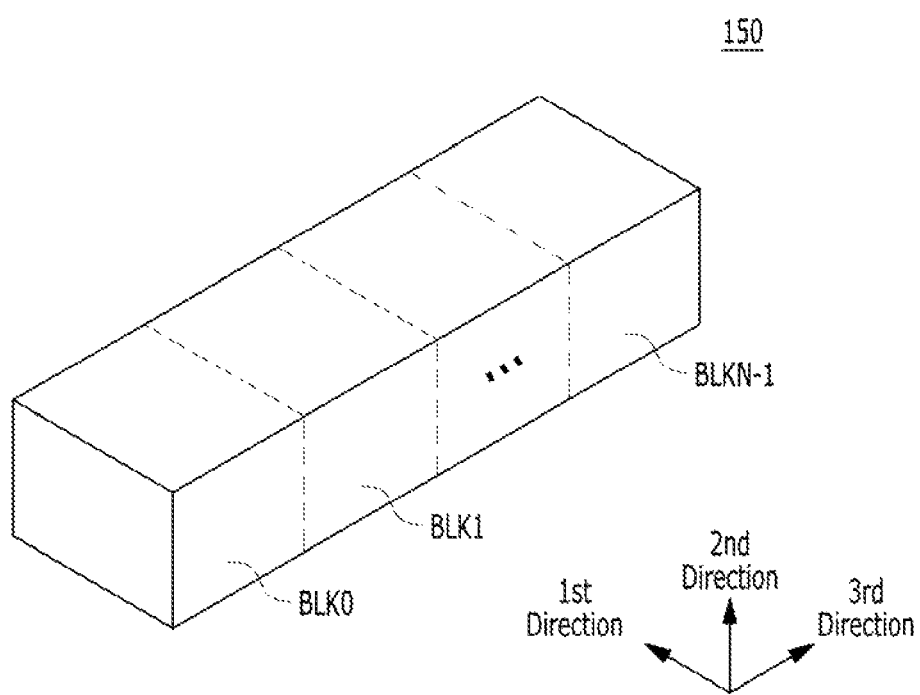
FIG. 4 is a diagram illustrating a configuration of a memory device, according to an exemplary embodiment of the present invention.

FIG. 4 is a diagram illustrating the memory blocks of the memory device 150 shown in FIG. 3, and the memory blocks BLK0 to BLKN-1 may be realized as a 3-dimensional structure (or a vertical structure). For example, the respective memory blocks BLK0 to BLKN-1 may be realized as a 3-dimensional structure by including a structure which extends in first to third directions (for example, the x-axis direction, the y-axis direction and the z-axis direction).

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN-1 may be electrically coupled to a plurality of bit lines, a plurality of drain select lines, a plurality of ground select lines, a plurality of word lines, a plurality of dummy word lines, and a plurality of common source lines.

Figure 5:
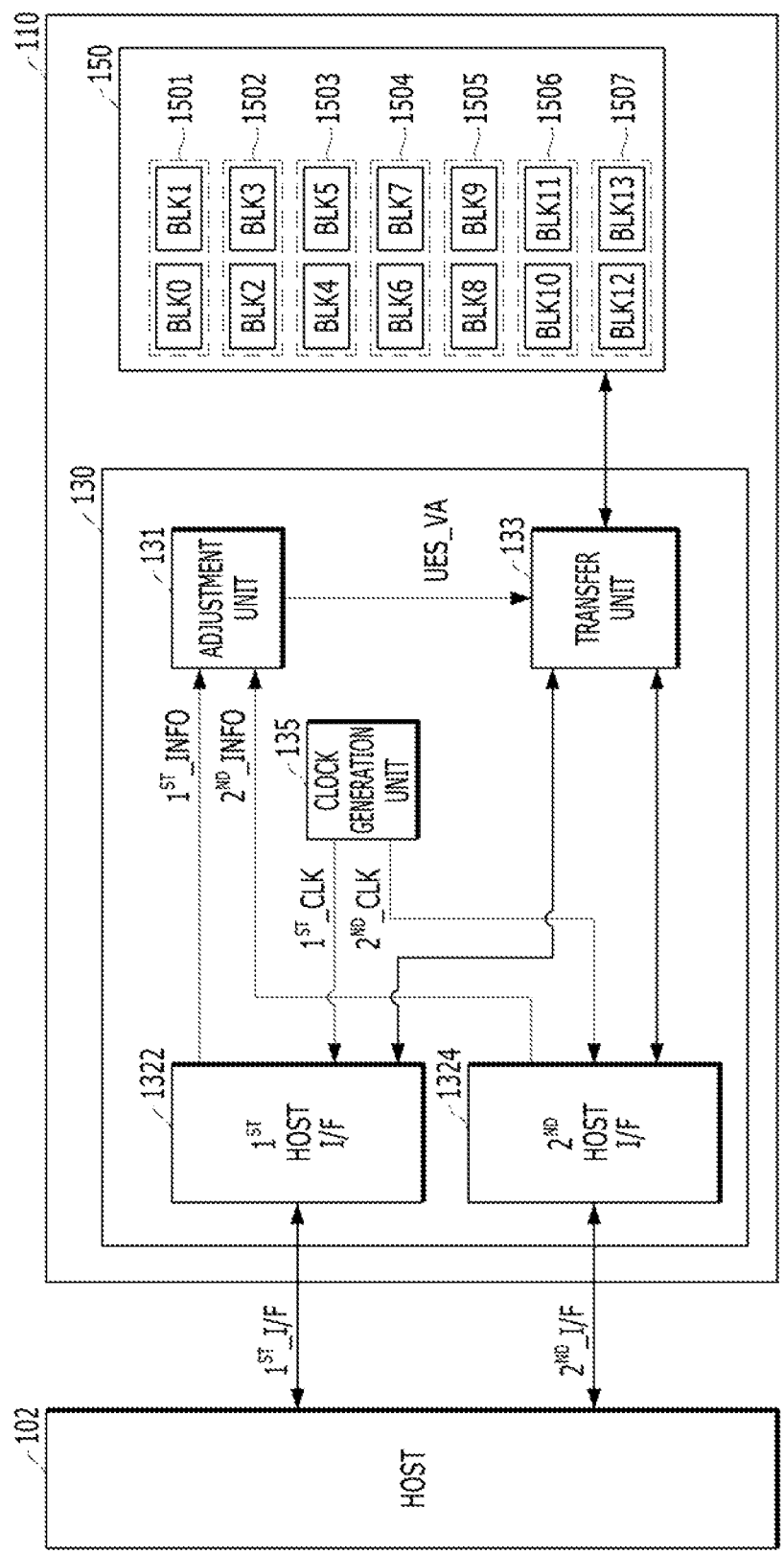
FIG. 5 is a block diagram illustrating a semiconductor memory system, in accordance with another embodiment of the present invention.

FIG. 5 is a block diagram illustrating a semiconductor memory system, in accordance with an embodiment of the present invention. We note, that the embodiment of FIG. 5 may also include the elements shown in the embodiment of FIG. 1, however, for ease of illustration these elements are not repeated herein.

Referring to FIG. 5, the memory system 110 includes the nonvolatile memory device 150 operatively coupled to the controller 130. It is noted, however, that two or more nonvolatile memory devices may also be included in the memory system 110.

It is also noted that a difference between the controller 130 illustrated in FIG. 1 and the controller 130 illustrated in FIG. 5 is that the controller 130 illustrated in FIG. 1 includes therein one host interface unit 132 whereas the controller 130 illustrated in FIG. 5 includes therein two host interface control units 1322 and 1324. The two host interface control units 1322 and 1324 may be included in a single host interface unit 132 as in the embodiment of FIG. 1, or may be implemented as two separate units as in the embodiment of FIG. 5.

Hence, the memory system 110 illustrated in FIG. 5, is coupled with the host 102 through two different interface control units 1322 and 1324.

The nonvolatile memory device 150 may be any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM). Descriptions will be made below on the assumption that the nonvolatile memory device 150 is a phase-change random access memory (PCRAM).

Referring to FIG. 5, the nonvolatile memory device 150 may include a plurality of storage regions 1501 to 1507. Each storage region may include one or more memory blocks, for example, two memory blocks as illustrated in FIG. 5. The storage regions of the nonvolatile memory device 150 may be divided in a first and a second storage regions whose capacity may be changed. For example, in FIG. 5, the capacity of each of the first and second storage regions may be changed by changing the number of storage regions that is allocated to each of the first and second storage regions. For example, in the case where zeroth and first memory blocks BLK<0:1> (i.e., the storage region 1501) among the plurality of memory blocks BLK<0:13> are identified as belonging to the first storage region, the remaining second to thirteenth memory blocks BLK<2:13> (i.e., storage regions 1502-1507) are identified as belonging to the second storage region. For another example, in the case where zeroth to third memory blocks BLK<0:3> (i.e., storage regions 1501 and 1502) among the plurality of memory blocks BLK<0:13> are identified as the first storage region, remaining fourth to thirteenth memory blocks BLK<4:13> (storage regions 1503 to 1507) are identified as the 20 second storage region.

For another example, in the case where zeroth to fifth memory blocks BLK<0:5> among the plurality of memory blocks BLK<0:13> (i.e., storage regions 1501, 1502 and 1503) are identified as the first storage region, remaining sixth to thirteenth memory blocks BLK<6:13> (i.e., storage regions 1504, 1505, 1506 and 1507) are identified as the second storage region. For yet another example, in the case where zeroth to seventh memory blocks BLK<0:7> (i.e., storage regions 1501, 1502, 1503 and 1504) are identified as the first storage region, remaining eighth to thirteenth memory blocks BLK<8:13> (i.e., storage regions 1505, 1506 and 1507) are identified as the second storage region.

For another example, in the case where zeroth to ninth memory blocks BLK<0:9> (i.e., storage regions 1501, 1502, 1503, 1504 and 1505) are identified as the first storage region, remaining tenth to thirteenth memory blocks BLK<10:13> (i.e., storage regions 1506 and 1507) are identified as the second storage region. For still another example, in the case where zeroth to eleventh memory blocks BLK<0:11 (i.e., storage regions 1501, 1502, 1503, 1504, 1505 and 1506) are identified as the first storage, remaining twelfth and thirteenth memory blocks BLK<12: 13> (i.e., storage region 1507) are identified as the second storage region.

The controller 130 may include a first interface 1ST_I/F and a second interface 2ND_I/F for inputting/outputting data between the controller 130 and the host 102. The controller 130 may input/output data to be outputted/inputted from/to the first storage region (e.g., for at least one among the storage regions 1501 to 1506) of the nonvolatile memory device 150, to/from the host 102, by using the first interface 1ST_I/F, and input/output data to be outputted/inputted from/to the second storage region (e.g., for at least one among the storage regions 1502 to 1507) of the nonvolatile memory device 150, to/from the host 102, by using the second interface 2ND_I/F.

Namely, the controller 130 may input/output data to be outputted/inputted from/to the memory blocks included in the first region (e.g., at least one among the storage regions 1501 to 1506) among the plurality of memory blocks BLK<0:13> included in the nonvolatile memory device 150, to/from the host 102, through the first interface 1ST_I/F. In the same manner, the controller 130 may input/output data to be outputted/inputted from/to the memory blocks included in the second region (e.g., at least one among the storage regions 1502 to 1507) among the plurality of memory blocks BLK<0:13> included in the nonvolatile memory device 150, to/from the host 102, through the second interface 2ND_I/F.

The controller 130 may check and compare the in-use capacity of the first interface 1ST_I/F and the in-use capacity of the second interface 2ND_I/F in a predetermined period, and according to the checking result the controller 130 may change the capacity of the first storage region (e.g., at least one among the storage regions 1501 to 1506) in the nonvolatile memory device 150 and the capacity of the second storage region (e.g., at least one among the storage regions 1502 to 1507) in the nonvolatile memory device 150.

The controller 130 may include a first interface control unit 1322, a second interface control unit 1324, an adjustment unit 131, a transfer unit 133, and a clock generation unit 135.

In order to allow data to be outputted/inputted from/to the first storage region of the nonvolatile memory device 150, to be outputted/inputted through the first interface 1ST_I/F, the transfer unit 133 may transfer the data to be outputted/ inputted from/to the first storage region of the nonvolatile memory device 150, through the first interface control unit 1322. Also, in order to allow data to be outputted/inputted from/to the second storage region of the nonvolatile memory device 150, to be outputted/inputted through the second interface 2ND_I/F, the transfer unit 133 may transfer the data to be outputted/inputted from/to the second storage region of the nonvolatile memory device 150, through the second interface control unit 1324.

A method for identifying, in the nonvolatile memory device 150, a capacity that is to be occupied by the first storage region and a capacity that is to be occupied by the second storage region may be controlled through the operation of the transfer unit 133.

For example, the transfer unit 133 may transfer data to be inputted/outputted to/from the zeroth and first memory blocks BLK<0:1> among the plurality of memory blocks BLK<0:13> included in the nonvolatile memory device 150, through the first interface control unit 1322, and may transfer data to be inputted/outputted to/from the remaining second to thirteenth memory blocks BLK<2:13>, through the second interface control unit 1324. Such an operation of the transfer unit 133 may correspond to the operation of identifying the zeroth and first memory blocks BLK<0:1> among the plurality of memory blocks BLK<0:13> included in the nonvolatile memory device 150, as the first storage region (including 1501), and identifying the remaining second to thirteenth memory blocks BLK<2:13> as the second storage region (including 1502, 1503, 1504, 1505, 1506 and 1507). For another example, the transfer unit 133 may transfer data to be inputted/outputted to/from the zeroth to third memory blocks BLK<0:3> among the plurality of memory blocks BLK<0:13> included in the nonvolatile memory device 150, through the first interface control unit 1322, and may transfer data to be inputted/outputted to/from the remaining fourth to thirteenth memory blocks BLK<4:13>, through the second interface control unit 1324. Such an operation of the transfer unit 133 may correspond to the operation of identifying the zeroth to third memory blocks BLK<0:3> among the plurality of memory blocks BLK<0:13> included in the nonvolatile memory device 150, as the first storage region (including 1501 and 1502), and identifying the remaining fourth to thirteenth memory blocks BLK<4:13> as the second storage region (including 1503, 1504, 1505, 1506 and 1507).

For another example, the transfer unit 133 may transfer data to be inputted/outputted to/from the zeroth to fifth memory blocks BLK<0:5> among the plurality of memory blocks BLK<0:13> included in the nonvolatile memory device 150, through the first interface control unit 1322, and may transfer data to be inputted/outputted to/from the remaining sixth to thirteenth memory blocks BLK<6:13>, through the second interface control unit 1324. Such an operation of the transfer unit 133 may correspond to the operation of identifying the zeroth to fifth memory blocks BLK<0:5> among the plurality of memory blocks BLK<0:13> included in the nonvolatile memory device 150, as the first storage region (including 1501, 1502 and 1503), and identifying the remaining sixth to thirteenth memory blocks BLK<6:13> as the second storage region (including 1504, 1505, 1506 and 1507). For another example, the transfer unit 133 may transfer data to be inputted/outputted to/from the zeroth to seventh memory blocks BLK<0:7> among the plurality of memory blocks BLK<0:13> included in the nonvolatile memory device 150, through the first interface control unit 1322, and may transfer data to be inputted/outputted to/from the remaining eighth to thirteenth memory blocks BLK<8:13>, through the second interface control unit 1324. Such an operation of the transfer unit 133 may correspond to the operation of identifying the zeroth to seventh memory blocks BLK<0:7> among the plurality of memory blocks BLK<0:13> included in the nonvolatile memory device 150, as the first storage region (including 1501, 1502, 1503 and 1504), and identifying the remaining eighth to thirteenth memory blocks BLK<8:13> as the second storage region (including 1505, 1506 and 1507).

For another example, the transfer unit 133 may transfer data to be inputted/outputted to/from the zeroth to ninth memory blocks BLK<0:9> among the plurality of memory blocks BLK<0:13> included in the nonvolatile memory device 150, through the first interface control unit 1322, and may transfer data to be inputted/outputted to/from the remaining tenth to thirteenth memory blocks BLK<10:13>, through the second interface control unit 1324. Such an operation of the transfer unit 133 may correspond to the operation of identifying the zeroth to ninth memory blocks BLK<0:9> among the plurality of memory blocks BLK<0:13> included in the nonvolatile memory device 150, as the first storage region (including 1501, 1502, 1503, 1504 and 1505), and identifying the remaining tenth to thirteenth memory blocks BLK<10:13> as the second storage region (including 1506 and 1507).

For another example, the transfer unit 133 may transfer data to be inputted/outputted to/from the zeroth to eleventh memory blocks BLK<0:11> among the plurality of memory blocks BLK<0:13> included in the nonvolatile memory device 150, through the first interface control unit 1322, and may transfer data to be inputted/outputted to/from the remaining twelfth and thirteenth memory blocks BLK<12:13>, through the second interface control unit 1324. Such an operation of the transfer unit 133 may correspond to the operation of identifying the zeroth to eleventh memory blocks BLK<0:11> among the plurality of memory blocks BLK<0:13> included in the nonvolatile memory device 150, as the first storage region (including 1501, 1502, 1503, 1504, 1505 and 1506), and identifying the remaining twelfth and thirteenth memory blocks BLK<12:13> as the second storage region (including 1507).

The adjustment unit 131 may check an in-use capacity 1ST_INFO of the first interface 1ST_I/F and an in-use capacity 2ND_INFO of the second interface 2ND_I/F, and may generate according to the checking result a control signal UES_VA for controlling the operation of the transfer unit 133, and may thereby change the capacity of the first storage region and the capacity of the second storage region in the nonvolatile memory device 150.

Checking the in-use capacity 1ST_INFO of the first interface 1ST_I/F and the in-use capacity 2ND_INFO of the second interface 2ND_I/F in the adjustment unit 131 may include a first and or a 15 second method as described below.

A first method is to directly check the size of the data inputted/outputted through the first interface 1ST_I/F and the size of the data inputted/outputted through the second interface 2ND_I/F in the predetermined period and compare the two.

First, for the first method, the first interface control unit 1322 may transfer the information 1ST_INFO on the size of the data inputted/outputted through the first interface 1ST_I/F in the predetermined period, to the adjustment unit 131. In the same manner, for the first method, the second interface control unit 1324 may transfer the information 2ND_INFO on the size of the data inputted/outputted through the second interface 2ND_I/F in the predetermined period, to the adjustment unit 131.

Then, the adjustment unit 131 may check the size of the data inputted/outputted through the first interface 1ST_I/F in the predetermined period, by referring to the information 1ST_INFO transferred from the first interface control unit 1322, and check the size of the data inputted/outputted through the second interface 2ND_I/F in the predetermined period, by referring to the information 2ND_INFO transferred from the second interface control unit 1324.

As a result of checking step, when the size of the data inputted/outputted through the first interface 1ST_I/F in the predetermined period is larger by at least a predetermined size than the size of the data inputted/outputted through the second interface 2ND_I/F in the predetermined period, the adjustment unit 131 may transfer the control signal UES_VA to the transfer unit 133, and may thereby increase the capacity of the first storage region in the nonvolatile memory device 150, by a predetermined magnitude, and may decrease the capacity of the second storage region in the nonvolatile memory device 150, by the predetermined magnitude.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F is larger by at least the predetermined size than the size of the data inputted/outputted through the second interface 2ND_I/F, the adjustment unit 131 may transfer the control signal UES_VA to the transfer unit 133 and may thereby control the transfer unit 133 so that the transfer unit 133 identifies the zeroth to seventh memory blocks BLK<0:7> among the plurality of memory blocks BLK<0:13> included in the nonvolatile memory device 150, as the first storage region (including 1501, 1502, 1503 and 1504), and identifies the eighth to thirteenth memory blocks BLK<8:13> as the second storage region (including 1505, 1506 and 1507).

As a result of checking step, when the size of the data inputted/outputted through the first interface 1ST_I/F in the predetermined period is smaller by at least the predetermined size than the size of the data inputted/outputted through the second interface 2ND_I/F in the predetermined period, the adjustment unit 131 may transfer the control signal UES_VA to the transfer unit 133, and thereby decrease the capacity of the first storage region in the nonvolatile memory device 150, by the predetermined magnitude, and may increase the capacity of the second storage region in the nonvolatile memory device 150, by the predetermined magnitude.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F is smaller by at least the predetermined size than the size of the data inputted/outputted through the second interface 2ND_I/F, the adjustment unit 131 may transfer the control signal UES_VA to the transfer unit 133 and may thereby control the transfer unit 133 so that the transfer unit 133 identifies the zeroth to third memory blocks BLK<0:3> among the plurality of memory blocks BLK<0:13> included in the nonvolatile memory device 150, as the first storage region (including 1501 and 1502), and identifies the fourth to thirteenth memory blocks BLK<4:13> as the second storage region (including 1503, 1504, 1505, 1506 and 1507).

As a result of checking step, when the size of the data inputted/outputted through the first interface 1ST_I/F in the predetermined period and the size of the data inputted/outputted through the second interface 2ND_I/F in the predetermined period have a difference smaller than the predetermined size, the adjustment unit 131 does not transfer the control signal UES_VA to the transfer unit 133, and the transfer unit 133 retains capacities to be occupied by the first storage region and the second storage region in the nonvolatile memory device 150, to be the same as those determined before the predetermined period is entered.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F in the predetermined period and the size of the data inputted/outputted through the second interface 2ND_I/F in the predetermined period have a difference smaller than the predetermined size, the adjustment unit 131 does not transfer the control signal UES_VA to the transfer unit 133, and the transfer unit 133 identifies the zeroth to fifth memory blocks BLK<0:5> among the plurality of memory blocks BLK<0:13> included in the nonvolatile memory device 150, as the first storage region (including 1501, 1502 and 1503), and identifies the sixth to thirteenth memory blocks BLK<6:13> as the second storage region (including 1504, 1505, 1506 and 1507), in the same manner as before the predetermined period is entered.

A second method is to compare the size of the data inputted/outputted through the first interface 1ST_I/F in the predetermined period with a first reference size, compare the size of the data inputted/outputted through the second interface 2ND_I/F in the predetermined period with a second reference size, and define the first and second storage regions based on the two comparison results.

First, for the second method, the first interface control unit 1322 may transfer the information 1ST_INFO on the size of the data inputted/outputted through the first interface 1ST_I/F in the predetermined period, to the adjustment unit 131. In the same manner, for the second method, the second interface control unit 1324 may transfer the information 2ND_INFO on the size of the data inputted/outputted through the second interface 2ND_I/F in the predetermined period, to the adjustment unit 131.

In the adjustment unit 131, the first reference size as a comparison reference for the size of the data inputted/outputted through the first interface 1ST_I/F is set in advance, and the second reference size as a comparison reference for the size of the data inputted/outputted through the second interface 2ND_I/F is set in advance.

Therefore, the adjustment unit 131 may check whether the size of the data inputted/outputted through the first interface 1ST_I/F in the predetermined period is larger or smaller than the first reference size, by referring to the information 1ST_INFO transferred from the first interface control unit 1322, and may also check whether the size of the data inputted/outputted through the second interface 2ND_I/F in the predetermined period is larger or smaller than the second reference size, by referring to the information 2ND_INFO transferred from the second interface control unit 1324.

As a result of the checking step, when the size of the data inputted/outputted through the first interface 1ST_I/F in the predetermined period is larger than the first reference size and the size of the data inputted/outputted through the second interface 2ND_I/F in the predetermined period is smaller than the second reference size, the adjustment unit 131 may transfer the control signal UES_VA to the transfer unit 133, and may thereby increase the capacity of the first storage region in the nonvolatile memory device 150, by a predetermined magnitude, and decrease the capacity of the second storage region in the nonvolatile memory device 150, by the predetermined magnitude.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F is larger than the first reference size and the size of the data inputted/outputted through the second interface 2ND_I/F is smaller than the second reference size, the adjustment unit 131 may transfer the control signal UES_VA to the transfer unit 133 and may thereby control the transfer unit 133 so that the transfer unit 133 identifies the zeroth to seventh memory blocks BLK<0:7> among the plurality of memory blocks BLK<0:13> included in the nonvolatile memory device 150, as the first storage region (including 1501, 1502, 1503 and 1504), and identifies the eighth to thirteenth memory blocks BLK<8:13> as the second storage region (including 1505, 1506 and 1507).

As a result of the checking step, in the case where the size of the data inputted/outputted through the first interface 1ST_I/F in the predetermined period is smaller than the first reference size and the size of the data inputted/outputted through the second interface 2ND_I/F in the predetermined period is larger than the 20 second reference size, the adjustment unit 131 may transfer the control signal UES_VA to the transfer unit 133, and thereby decrease the capacity of the first storage region in the nonvolatile memory device 150, by the predetermined magnitude, and increase the capacity of the second storage region in the nonvolatile memory device 150, by the predetermined magnitude.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region including (1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F is smaller than the first reference size and the size of the data inputted/outputted through the second interface 2ND_I/F is larger than the second reference size, the adjustment unit 131 may transfer the control signal UES_VA to the transfer unit 133 to and may thereby control the transfer unit 133 so that the transfer unit 133 identifies the zeroth to third memory blocks BLK<0:3> among the plurality of memory blocks BLK<0:13> included in the nonvolatile memory device 150, as the first storage region (including 1501 and 1502) and identifies the fourth to thirteenth memory blocks BLK<4:13> as the second storage region (including 1503, 1504, 1505, 1506 and 1507).

As a result of the checking step, when the size of the data inputted/outputted through the first interface 1ST_I/F in the predetermined period is larger than the first reference size and the size of the data inputted/outputted through the second interface 2ND_I/F is larger than the second reference size, the adjustment unit 131 does not transfer the control signal UES_VA to the transfer unit 133, and the transfer unit 133 retains capacities to be occupied by the first storage region and the second storage region in the nonvolatile memory device 150, to be the same as those determined before the predetermined period is entered.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F in the predetermined period is larger than the first reference size and the size of the data inputted/outputted through the second interface 2ND_I/F in the predetermined period is larger than the second reference size, the adjustment unit 131 does not transfer the control signal UES_VA to the transfer unit 133, and the transfer unit 133 identifies the zeroth to fifth memory blocks BLK<0:5> among the plurality of memory blocks BLK<0:13> included in the nonvolatile memory device 150, as the first storage region (including 1501, 1502 and 1503), and identifies the sixth to thirteenth memory blocks BLK<6:13> as the second storage region (including 1504, 1505, 1506 and 1507), in the same manner as before the predetermined period is entered.

As a result of the checking step, when the size of the data inputted/outputted through the first interface 1ST_I/F in the predetermined period is smaller than the first reference size and the size of the data inputted/outputted through the second interface 2ND_I/F is smaller than the second reference size, the adjustment unit 131 does not transfer the control signal UES_VA to the transfer unit 133, and the transfer unit 133 retains capacities to be occupied by the first storage region and the second storage region in the nonvolatile memory device 150, to be the same as those determined before the predetermined period is entered.

For example, it may be assumed that, before the predetermined period is entered, the zeroth to fifth memory blocks BLK<0:5> among the plurality of memory blocks BLK<0:13> included in the nonvolatile memory device 150 may be identified as the first storage region (including 1501, 1502 and 1503) and the sixth to thirteenth memory blocks BLK<6:13> may be identified as the second storage region (including 1504, 1505, 1506 and 1507). As the predetermined period is entered in this state, when the size of the data inputted/outputted through the first interface 1ST_I/F in the predetermined period is smaller than the first reference size and the size of the data inputted/outputted through the second interface 2ND_I/F in the predetermined period is smaller than the second reference size, the adjustment unit 131 does not transfer the control signal UES_VA to the transfer unit 133, and the transfer unit 133 identifies the zeroth to fifth memory blocks BLK<0:5> among the plurality of memory blocks BLK<0:13> included in the nonvolatile memory device 150, as the first storage region (including 1501, 1502 and 1503), and identifies the sixth to thirteenth memory blocks BLK<6:13> as the second storage region (including 1504, 1505, 1506 and 1507), in the same manner as before the predetermined period is entered.

The predetermined period as a reference for the operation of the adjustment unit 131 may correspond to a predetermined time interval. The predetermined period as a reference for the operation of the adjustment unit 131 may be repeatedly entered with a predetermined cycle from a time when power is supplied to the memory system 110. Alternatively, the predetermined period as a reference for the operation of the adjustment unit 131 may be entered every time a predetermined event occurs. The value of the predetermined time interval and the magnitude of the predetermined cycle may be changed variously according to design. Also, to which operation the predetermined event may correspond may be changed variously according to design.

It may be seen from the above descriptions that, in the present embodiment, when the transfer unit 133 changes the sizes of the first storage region and the second storage region of the nonvolatile memory device 150, a preselected size as a reference for the operation of the transfer unit 133 may be the size of each storage region 1501, 1502, 1503, 1504, 1505, 1506 or 1507 corresponding to two memory blocks. However, this is just an example, and it is to be noted that, according to design, the preselected size may be larger or smaller than the size of each storage region 1501, 1502, 1503, 1504, 1505, 1506 or 1507. For example, the preselected size may be a memory block.

The clock generation unit 135 may generate a first clock 1ST_CLK and a second clock 2ND_CLK, with the first clock $1^{ST}$ CLK having a relatively higher frequency than the second clock 2ND_CLK. The clock generation unit 135 may generate simultaneously the first clock 1ST_CLK and the second clock 2ND_CLK which have different frequencies. The first clock 1ST_CLK may have a higher frequency than the second clock 2ND_CLK.

In this way, the first clock 1ST_CLK which is generated by the clock generation unit 135 and has a relatively higher frequency may be transferred to the first interface control unit 1322. As a consequence, it is possible to accelerate the speed at which data are transferred through the first interface 1ST_I/F as compared to data which are transferred through the second interface 2ND_I/F.

Hence, it is possible to accelerate relatively the speed at which data to be outputted/inputted from/to the first storage region of the nonvolatile memory device 150 and be transferred through the first interface control unit 1322 by the operation of the transfer unit 133 are inputted/outputted to/from the host 102 through the first interface 1ST_I/F.

Moreover, the second clock 2ND_CLK which is generated by the clock generation unit 135 and has a relatively lower frequency may be transferred to the second interface control unit 1324. As a consequence, it is possible to decelerate relatively a speed at which data to be outputted/inputted from/to the second storage region of the nonvolatile memory device 150 and be transferred through the second interface control unit 1324 by the operation of the transfer unit 133 are inputted/outputted to/from the host 102 through the second interface 2ND_I/F.

In other words, the clock generation unit 135 and the transfer unit 133 may operate so that a speed at which data to be outputted/inputted from/to the first storage region of the nonvolatile memory device 150 are transferred through the first interface 1ST_I/F may be higher than a speed at which data to be outputted/inputted from/to the second storage region of the nonvolatile memory device 150 are transferred through the second interface 2ND_I/F.

Hence, the controller 130 may input/output data to be outputted/inputted from/to the first storage region of the nonvolatile memory device 150, to/from the host 102, through the first interface 1ST_I/F which operates in response to the first clock 1ST_CLK. Further, the controller 130 may input/output data to be outputted/inputted from/to the second storage region of the nonvolatile memory device 150, to/from the host 102, through the second interface 2ND_I/F which operates in response to the second clock 2ND_CLK.

Since the first clock 1ST_CLK is generated by the clock generation unit 135 to have a frequency higher than the second clock 2ND_CLK, a speed at which data to be outputted/inputted from/to the first storage region of the nonvolatile memory device 150 are transferred through the first interface 1ST_I/F is higher than a speed at which data to be outputted/inputted from/to the second storage region of the nonvolatile memory device 150 are transferred through the second interface 2ND_I/F.

Therefore, the controller 130 may input/output data to be outputted/inputted from/to the first storage region of the nonvolatile memory device 150, to/from the host 102, at a relatively higher speed than the speed at which the controller 130 may input/output data to be outputted/inputted from/to the second storage region of the nonvolatile memory device 150, to/from the host 102.

In addition, the controller 130 may change the capacity of (e.g., the size) the first storage region and the capacity (e.g., the size) of the second storage region in the nonvolatile memory device 150, according to a result of checking the in-use capacity 1ST_INFO of the first interface 1ST_I/F and the in-use capacity 2ND_INFO of the second interface 2ND_I/F.

Therefore, the controller 130 may change the capacity of the first storage region and the capacity of the second storage region in the nonvolatile memory device 150, according to an in-use capacity for the first storage region of the nonvolatile memory device 150 and an in-use capacity for the second storage region of the nonvolatile memory device 150.

As aforementioned, the first interface 1ST_I/F may transfer data at a higher speed than the second interface 2ND_I/F. For example, the first interface 1ST_I/F may be implemented with a dual in-line memory module (DIMM) interface, whereas the second interface 2ND_I/F may be implemented with a PCI-express (peripheral component interconnect express: PCI-e) interface.

The controller 130 may cause the first storage region of the nonvolatile memory device 150 to operate as the main memory device of the host 102, that is, a main memory which may be implemented, for example, with a DRAM. Also, the controller 130 may cause the second storage region of the nonvolatile memory device 150 to operate as the storage of the host 102, which may be implemented, for example, with a NAND flash memory.

The nonvolatile memory device 150 of the memory system 110 may include one or more memory devices and may be used at least as one of a main memory device of the host 102 and a storage of the host 102. In an embodiment, the nonvolatile memory device 150 of the memory system 110 may include one or more memory devices and may be used simultaneously as a main memory device of the host 102 and a storage of the host 102.

Furthermore, the size of a storage region which is to be used as the main memory device of the host 102 and the size of a region which is to be used as the storage of the host 102 may be changeably adjusted.

Figure 6:
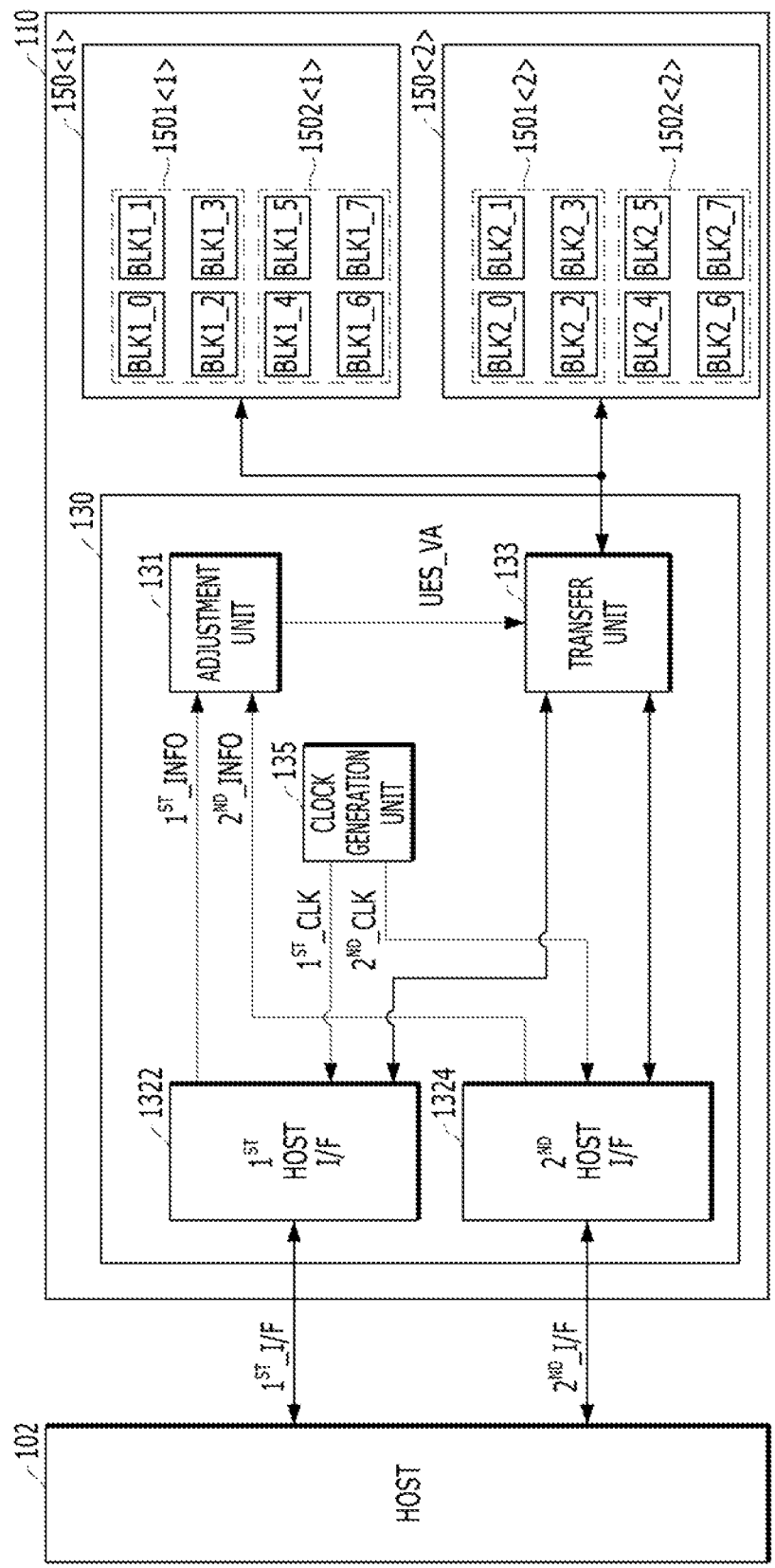
FIG. 6 is a block diagram illustrating a semiconductor memory system in accordance with yet another embodiment of the present invention.

FIG. 6 is a block diagram illustrating a semiconductor system, in accordance with an embodiment of the present invention.

Referring to FIG. 6, a memory system 110 is provided which includes a nonvolatile memory device 150 operatively coupled to a host 102. The memory system 110 includes two nonvolatile memory devices 150<1> and 150<2>. We note, that this is simply an example, and that in other embodiments three or more nonvolatile memory devices may be included in the memory system 110.

Further, the memory system 110 includes a controller 130. For ease of illustration, controller 130 of FIG. 6 is illustrated as comprising only components 1322, 1324, 131, 133 and 135. However, it is noted, that controller 130 of FIG. 6 may also include other components such as components 132, 134, 138, 140 and 142 included in the controller 130 of FIG. 1.

A difference in the components between the controller 130 illustrated in FIG. 1 and the controller 130 illustrated in FIG. 6 is that the controller 130 illustrated in FIG. 1 includes therein one host interface unit 132 whereas controller 130 illustrated in FIG. 6 includes therein two host interface control units 1322 and 1324.

Hence, the memory system 110 illustrated in FIG. 6 may include a first nonvolatile memory device 150<1>, a second nonvolatile memory device 150<2>, and the controller 130.

Each of the first nonvolatile memory device 150<1> and the second nonvolatile memory device 150<2> may be any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM). However, it is to be noted that the present embodiment of the disclosure is not limited thereto, and descriptions will be made below on the assumption that each of the first nonvolatile memory device 150<1> and the second nonvolatile memory device 150<2> is a phase-change random access memory (PCRAM).

The first nonvolatile memory device 150<1> may include a first storage region including 1501<1> and a second storage region 1502<1>. In the first nonvolatile memory device 150<1>, a capacity that occupied by the first storage region 1501<1> and a capacity that is occupied by the second storage region 1502<1> may be changeable. That is to say, a plurality of memory blocks BLK1_<0:7> included in the first nonvolatile memory device 150<1> may be divided and identified as the first storage region including 1501<1> and the second storage region 1502<1>. For example, it may be seen from FIG. 6 that, among the plurality of memory blocks BLK1_<0:7>, zeroth to third memory blocks BLK1_<0:3> are included in the first storage region 1501<1> and fourth to seventh memory blocks BLK1_<4:7> are included in the second storage region 1502<1>. However, we note that this is nothing but a mere example. For example (although not shown), at least one to at most seven memory blocks BLK1_0, BLK1_<0:1>, BLK1_<0:2>, BLK1_<0:3>, BLK1_<0:4>, BLK1_<0:5> or BLK1_<0:6> may be included in the first storage region 1501<1>, and, depending on how many memory blocks are included in the first storage region including 1501<1>, at most seven to at least one memory block BLK1_<1:7>, BLK1_<2:7>, BLK1_<3:7>, BLK1_<4:7>, BLK1_<5:7>, BLK1_<6:7> or BLK1_7 may be included in the second storage region 1502<1>.

The second nonvolatile memory device 150<2> may include a third storage region 1501<2> and a fourth storage region 1502<2>. In the second nonvolatile memory device 150<2>, a capacity that is occupied by the third storage region 1501<2> and a capacity that is occupied by the fourth storage region 1502<2> may be changeable. That is to say, a plurality of memory blocks BLK2_<0:7> included in the second nonvolatile memory device 150<2> may be divided and identified as the third storage region 1501<2> and the fourth storage region 1502<2>. For example, it may be seen from FIG. 6 that, among the plurality of memory blocks BLK2_<0:7>, zeroth to third memory blocks BLK2_<0:3> are included in the third storage region 1501<2> and fourth to seventh memory blocks BLK2_<4:7> are included in the fourth storage region 1502<2>. However, this is nothing but a mere example. Actually, unlike the illustration in FIG. 6, at least one to at most seven memory blocks BLK2_0, BLK2_<0:1>, BLK2_<0:2>, BLK2_<0:3>, BLK2_<0:4>, BLK2_<0:5> or BLK2_<0:6> may be included in the third storage region 1501<2>, and depending on how many memory blocks are included in the third storage region 1501<2>, at most seven to at least one memory block BLK2_<1:7>, BLK2_<2:7>, BLK2_<3:7>, BLK2_<4:7>, BLK2_<5:7>, BLK2_<6:7> or BLK2_7 may be included in the fourth storage region 1502<2>.

The controller 130 may include a first interface 1ST_I/F and a second interface 2ND_I/F for inputting/outputting data between the controller 130 and the host 102. The controller 130 may input/output data to be outputted/inputted from/to at least one storage region among the first storage region 1501<1> to the third storage region 1501<2>, to/from the host 102, by using the first interface 1ST_I/F, and input/output data to be outputted/inputted from/to at least one storage region among the second storage region 1502<1> to the fourth storage region 1502<2>, to/from the host 102, by using the second interface 2ND_I/F.

In other words, the controller 130 may control data to be outputted/inputted from/to the first storage region 1501<1> of the first nonvolatile memory device 150<1>, to be unconditionally inputted/outputted to/from the host 102 through the first interface 1ST_I/F, whereas controls data to be outputted/inputted from/to the second storage region 1502<1> of the first nonvolatile memory device 150<1>, to be inputted/outputted to/from the host 102 selectively through the first interface 1ST_I/F or the second interface 2ND_I/F. In the same manner, the controller 130 may control data to be outputted/inputted from/to the fourth storage region 1502<2> of the second nonvolatile memory device 150<2>, to be unconditionally inputted/outputted to/from the host 102 through the second interface 2ND_I/F, whereas controls data to be outputted/inputted from/to the third storage region 1501<2> of the second nonvolatile memory device 150<2>, to be inputted/outputted to/from the host 102 selectively through the second interface 2ND_I/F or the first interface 1ST_I/F.

The controller 130 may check the in-use capacity of the first interface 1ST_I/F and the in-use capacity of the second interface 2ND_I/F in a predetermined period, and according to a checking result, select whether the second storage region 1502<1> of the first nonvolatile memory device 150<1> will input/output data by using the first interface 1ST_I/F or will input/output data by using the second interface 2ND_I/F and select whether the third storage region 1501<2> of the second nonvolatile memory device 150<2> will input/output data by using the first interface 1ST_I/F or will input/output data by using the second interface 2ND_I/F.

Namely, the controller 130 may check the in-use capacity of the first interface 1ST_I/F and the in-use capacity of the second interface 2ND_I/F in the predetermined period, and according to a checking result, select whether at least one storage region to input/output data through the first interface 1ST_I/F will be the first storage region 1501<1>, the first and second storage regions 1501<1> and 1502<1>, the first and third storage regions 1501<1> and 1501<2> or the first to third storage regions 1501<1>, 1502<1> and 1501<2> and select whether at least one storage region to input/output data through the second interface 2ND_I/F will be the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>.

The controller 130 may include a first interface control unit 1322, a second interface control unit 1324, an adjustment unit 131, a transfer unit 133, and a clock generation unit 135.

In order to allow data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2>, to be outputted/inputted through the first interface 1ST_I/F, the transfer unit 133 may transfer the data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2>, through the first interface control unit 1322. Also, in order to allow data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>, to be outputted/inputted through the second interface 2ND_I/F, the transfer unit 133 may transfer the data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>, through the second interface control unit 1324.

The operation of selecting whether the second storage region 1502<1> will input/output data by using the first interface 1ST_I/F or will input/output data by using the second interface 2ND_I/F and the operation of selecting whether the third storage region 1501<2> will input/output data by using the first interface 1ST_I/F or will input/output data by using the second interface 2ND_I/F may be controlled through the operation of the transfer unit 133 which is controlled by the adjustment unit 131.

For example, if the transfer unit 133 controls both the second storage region 1502<1> and the third storage region 1501<2> to input/output data by using the first interface 1ST_I/F, all data to be outputted/inputted from/to the first to third storage regions 1501<1>, 1502<1> and 1501<2> may be inputted/outputted to/from the host 102 through the first interface 1ST_I/F, and only data to be outputted/inputted from/to the fourth storage region 1502<2> may be inputted/outputted to/from the host 102 through the second interface 2ND_I/F.

For another example, if the transfer unit 133 controls the second storage region 1502<1> to input/output data by using the first interface 1ST_I/F and controls the third storage region 1501<2> to input/output data by using the second interface 2ND_I/F, data to be outputted/inputted from/to the first and second storage regions 1501<1> and 1502<1> may be inputted/outputted to/from the host 102 through the first interface 1ST_I/F, and data to be outputted/inputted from/to the third and fourth storage region 1501<2> and 1502<2> may be inputted/outputted to/from the host 102 through the second interface 2ND_I/F.

For another example, if the transfer unit 133 controls both the second storage region 1502<1> and the third storage region 1501<2> to input/output data by using the second interface 2ND_I/F, only data to be outputted/inputted from/to the first storage region 1501<1> may be inputted/outputted to/from the host 102 through the first interface 1ST_I/F, and all data to be outputted/Inputted from/to the second to fourth storage regions 1502<1>, 1501<2> and 1502<2> may be inputted/outputted to/from the host 102 through the second interface 2ND_I/F.

The adjustment unit 131 may check an in-use capacity 1ST_INFO of the first interface 1ST_I/F and an in-use capacity 2ND_INFO of the second interface 2ND_I/F, generate, according to a checking result, a control signal UES_VA for controlling the operation of the transfer unit 133, and thereby select whether each of the second storage region 1502<1> and the third storage region 1501<2> will input/output data by using the first interface 1ST_I/F or will input/output data by using the second interface 2ND_I/F.

A scheme of checking the in-use capacity 1ST_INFO of the first interface 1ST_I/F and the in-use capacity 2ND_INFO of the second interface 2ND_I/F in the adjustment unit 131 may be divided into two methods as described below.

A first method is to directly compare and check the size of the data inputted/outputted through the first interface 1ST_I/F and the size of the data inputted/outputted through the second interface 2ND_I/F in the predetermined period.

First, for the first method, the first interface control unit 1322 may transfer the information 1ST_INFO on the size of the data inputted/outputted through the first interface 1ST_I/F in the predetermined period, to the adjustment unit 131. In the same manner, for the first method, the second interface control unit 1324 may transfer the information 2ND_INFO on the size of the data inputted/outputted through the second interface 2ND_I/F in the predetermined period, to the adjustment unit 131.

Then, the adjustment unit 131 may check the size of the data inputted/outputted through the first interface 1ST_I/F in the predetermined period, by referring to the information 1ST_INFO transferred from the first interface control unit 1322, and check the size of the data inputted/outputted through the second interface 2ND_I/F in the predetermined period, by referring to the information 2ND_INFO transferred from the second interface control unit 1324.

As a result of checking step, when the size of the data inputted/outputted through the first interface 1ST_I/F in the predetermined period is larger by at least a predetermined size than the size of the data inputted/outputted through the second interface 2ND_I/F in the predetermined period, the adjustment unit 131 may transfer the control signal UES_VA to the transfer unit 133, and may thereby control at least two storage regions {1501<1> and 1502<1>}, {1501<1> and 1501<2>} or {1501<1>, 1502<1> and 1501<2>} among the first to third storage regions 1501<1>, 1502<1> and 1501<2> to input/output data by using the first interface 1ST_I/F and control at most two storage regions {1502<2> and 1501<2>}, {1502<2> and 1502<1>} or 1502<2> among the second to fourth storage regions 1502<1>, 1501<2> and 1502<2> to input/output data by using the second interface 2ND_I/F.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F is larger by at least the predetermined size than the size of the data inputted/outputted through the second interface 2ND_I/F, the adjustment unit 131 may transfer the control signal UES_VA to the transfer unit 133 and may thereby control the transfer unit 133 so that the transfer unit 133 controls the first to third storage regions 1501<1>, 1502<1> and 1501<2> to input/output data by using the first interface 1ST_I/F and controls the fourth storage region 1502<2> to input/output data by using the second interface 2ND_I/F.

As a result of checking step, when the size of the data inputted/outputted through the first interface 1ST_I/F in the predetermined period is smaller by at least the predetermined size than the size of the data inputted/outputted through the second interface 2ND_I/F in the predetermined period, the adjustment unit 131 may transfer the control signal UES_VA to the transfer unit 133, and may thereby control at most two storage regions {1501<1> and 1502<1>}, {1501<1> and 1501<2>} or 1501<1> among the first to third storage regions 1501<1>, 1502<1> and 1501<2> to input/output data by using the first interface 1ST_I/F and control at least two storage regions {1502<2> and 1501<2>}, {1502<2> and 1502<1>} or {1502<2>, 1501<2> and 1502<1>} among the second to fourth storage regions 1502<1>, 1501<2> and 1502<2> to input/output data by using the second interface 2ND_I/F.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F is smaller by at least the predetermined size than the size of the data inputted/outputted through the second interface 2ND_I/F, the adjustment unit 131 may transfer the control signal UES_VA to the transfer unit 133 and may thereby control the transfer unit 133 so that the transfer unit 133 controls the first storage region 1501<1> to input/output data by using the first interface 1ST_I/F and controls the second to fourth storage regions 1502<1>, 1501<2> and 1502<2> to input/output data by using the second interface 2ND_I/F.

As a result of checking step, when the size of the data inputted/outputted through the first interface 1ST_I/F in the predetermined period and the size of the data inputted/outputted through the second interface 2ND_I/F in the predetermined period have a difference smaller than the predetermined size, the adjustment unit 131 does not transfer the control signal UES_VA to the transfer unit 133, and the transfer unit 133 controls the first to fourth storage regions 1501<1>, 1502<1>, 1501<2> and 1502<2> to use the first and second interfaces 1ST_I/F and 2ND_I/F having been used to input/output data before the predetermined period is entered, as they are.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F in the predetermined period and the size of the data inputted/outputted through the second interface 2ND_I/F in the predetermined period have a difference smaller than the predetermined size, the adjustment unit 131 does not transfer the control signal UES_VA to the transfer unit 133, and the transfer unit 133 controls the first and second storage regions 1501<1> and 1502<1> to input/output data by using the first interface 1ST_I/F and controls the third and fourth storage regions 1501<2> and 1502<2> to input/output data by using the second interface 2ND_I/F, in the same manner as before the predetermined period is entered.

A second method is to compare the size of the data inputted/outputted through the first interface 1ST_I/F in the predetermined period with a first reference size, compare the size of the data inputted/outputted through the second interface 2ND_I/F in the predetermined period with a second reference size, and combine the two comparison results.

First, for the second method, the first interface control unit 1322 may transfer the information 1ST_INFO on the size of the data inputted/outputted through the first interface 1ST_I/F in the predetermined period, to the adjustment unit 131. In the same manner, for the second method, the second interface control unit 1324 may transfer the information 2ND_INFO on the size of the data inputted/outputted through the second interface 2ND_I/F in the predetermined period, to the adjustment unit 131.

In the adjustment unit 131, the first reference size as a comparison reference for the size of the data inputted/outputted through the first interface 1ST_I/F is set in advance, and the second reference size as a comparison reference for the size of the data inputted/outputted through the second interface 2ND_I/F is set in advance.

Therefore, the adjustment unit 131 may check whether the size of the data inputted/outputted through the first interface 1ST_I/F in the predetermined period is larger or smaller than the first reference size, by referring to the information 1ST_INFO transferred from the first interface control unit 1322, and check whether the size of the data inputted/outputted through the second interface 2ND_I/F in the predetermined period is larger or smaller than the second reference size, by referring to the information 2ND_INFO transferred from the second interface control unit 1324.

As a result of checking step, when the size of the data inputted/outputted through the first interface 1ST_I/F in the predetermined period is larger than the first reference size and the size of the data inputted/outputted through the second interface 2ND_I/F in the predetermined period is smaller than the second reference size, the adjustment unit 131 may transfer the control signal UES_VA to the transfer unit 133, and may thereby control at least two storage regions {1501<1> and 1502<1>}, {1501<1> and 1501<2>} or {1501<1>, 1502<1> and 1501<2>} among the first to third storage regions 1501<1>, 1502<1> and 1501<2> to input/output data by using the first interface 1ST_I/F and control at most two storage regions {1502<2> and 1501<2>}, {1502<2> and 1502<1>} or 1502<2> among the second to fourth storage regions 1502<1>, 1501<2> and 1502<2> to input/output data by using the second interface 2ND_I/F.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F is larger than the first reference size and the size of the data inputted/outputted through the second interface 2ND_I/F is smaller than the second reference size, the adjustment unit 131 may transfer the control signal UES_VA to the transfer unit 133 and may thereby control the transfer unit 133 so that the transfer unit 133 controls the first to third storage regions 1501<1>, 1502<1> and 1501<2> to input/output data by using the first interface 1ST_I/F and controls the fourth storage region 1502<2> to input/output data by using the second interface 2ND_I/F.

As a result of checking step, when the size of the data inputted/outputted through the first interface 1ST_I/F in the predetermined period is smaller than the first reference size and the size of the data inputted/outputted through the second interface 2ND_I/F in the predetermined period is larger than the second reference size, the adjustment unit 131 may transfer the control signal UES_VA to the transfer unit 133, and may thereby control at most two storage regions {1501<1> and 1502<1>}, {1501<1> and 1501<2>} or 1501<1> among the first to third storage regions 1501<1>, 1502<1> and 1501<2> to input/output data by using the first interface 1ST_I/F and control at least two storage regions {1502<2> and 1501<2>}, {1502<2> and 1502<1>} or ({1502<2>, 1501<2> and 1502<1>} among the second to fourth storage regions 1502<1>, 1501<2> and 1502<2> to input/output data by using the second interface 2ND_I/F.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F is smaller than the first reference size and the size of the data inputted/outputted through the second interface 2ND_I/F is larger than the second reference size, the adjustment unit 131 may transfer the control signal UES_VA to the transfer unit 133 and may thereby control the transfer unit 133 so that the transfer unit 133 controls the first storage region including 1501<1> to input/output data by using the first interface 1ST_I/F and controls the second to fourth storage regions 1502<1>, 1501<2> and 1502<2> to input/output data by using the second interface 2ND_I/F.

As a result of checking step, when the size of the data inputted/outputted through the first interface 1ST_I/F in the predetermined period is larger than the first reference size and the size of the data inputted/outputted through the second interface 2ND_I/F in the predetermined period is larger than the second reference size, the adjustment unit 131 does not transfer the control signal UES_VA to the transfer unit 133, and the transfer unit 133 controls the first to fourth storage regions 1501<1>, 1502<1>, 1501<2> and 1502<2> to use the first and second interfaces 1ST_I/F and 2ND_I/F having been used to input/output data before the predetermined period is entered, as they are.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F in the predetermined period is larger than the first reference size and the size of the data inputted/outputted through the second interface 2ND_I/F in the predetermined period is larger than the second reference size, the adjustment unit 131 does not transfer the control signal UES_VA to the transfer unit 133, and the transfer unit 133 controls the first and second storage regions 1501<1> and 1502<1> to input/output data by using the first interface 1ST_I/F and controls the third and fourth storage regions 1501<2> and 1502<2> to input/output data by using the second interface 2ND_I/F, in the same manner as before the predetermined period is entered.

As a result of checking step, when the size of the data inputted/outputted through the first interface 1ST_I/F in the predetermined period is smaller than the first reference size and the size of the data inputted/outputted through the second interface 2ND_I/F in the predetermined period is smaller than the second reference size, the adjustment unit 131 does not transfer the control signal UES_VA to the transfer unit 133, and the transfer unit 133 controls the first to fourth storage regions 1501<1>, 1502<1>, 1501<2> and 1502<2> to use the first and second interfaces 1ST_I/F and 2ND_I/F having been used to input/output data before the predetermined period is entered, as they are.

For example, it may be assumed that, before the predetermined period is entered, the first and second storage regions 1501<1> and 1502<1> input/output data through the first interface 1ST_I/F and the third and fourth storage regions 1501<2> and 1502<2> input/output data through the second interface 2ND_I/F. As the predetermined period is entered in this state, when the size of the data inputted/outputted through the first interface 1ST_I/F in the predetermined period is smaller than the first reference size and the size of the data inputted/outputted through the second interface 2ND_I/F in the predetermined period is smaller than the second reference size, the adjustment unit 131 does not transfer the control signal UES_VA to the transfer unit 133, and the transfer unit 133 controls the first and second storage regions 1501<1> and 1502<1> to input/output data by using the first interface 1ST_I/F and controls the third and fourth storage regions 1501<2> and 1502<2> to input/output data by using the second interface 2ND_I/F, in the same manner as before the predetermined period is entered.

The predetermined period as a reference for the operation of the adjustment unit 131 may correspond to a predetermined time interval. The predetermined period as a reference for the operation of the adjustment unit 131 may be repeatedly entered with a predetermined cycle from a time when power is supplied to the memory system 110. Alternatively, the predetermined period as a reference for the operation of the adjustment unit 131 may be repeatedly entered every time a predetermined event occurs. For reference, the value of the predetermined time interval and the magnitude of the predetermined cycle may be changed variously according to design. Also to which operation the predetermined event may correspond may be changed variously according to design.

The clock generation unit 135 may generate a first clock 1ST_CLK and a second clock 2ND_CLK. The first clock 1ST_CLK may have a relatively higher frequency than the second clock 2ND_CLK. The clock generation unit 135 may generate simultaneously the first clock 1ST_CLK and the second clock 2ND_CLK which have different frequencies with the first clock 1ST_CLK having a frequency higher than the second clock 2ND_CLK.

In this way, the first clock 1ST_CLK which is generated by the clock generation unit 135 and has a relatively higher frequency may be transferred to the first interface control unit 1322. As a consequence, it is possible to accelerate relatively a speed at which data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2> and be transferred through the first interface control unit 1322 by the operation of the transfer unit 133 are inputted/outputted to/from the host 102 through the first interface 1ST_I/F.

Moreover, the second clock 2ND_CLK which is generated by the clock generation unit 135 and has a relatively lower frequency may be transferred to the second interface control unit 1324. As a consequence, it is possible to decelerate relatively a speed at which data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2> and be transferred through the second interface control unit 1324 by the operation of the transfer unit 133 are inputted/outputted to/from the host 102 through the second interface 2ND_I/F.

In other words, the clock generation unit 135 and the transfer unit 133 may operate so that a speed at which data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2> are transferred through the first interface 1ST_I/F may be higher than a speed at which data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2> are transferred through the second interface 2ND_I/F.

Hence, the controller 130 may input/output data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2>, to/from the host 102, through the first interface 1ST_I/F which operates in response to the first clock 1ST_CLK. The controller 130 may input/output data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>, to/from the host 102, through the second interface 2ND_I/F which operates in response to the second clock 2ND_CLK.

Since the first clock 1ST_CLK is generated by the clock generation unit 135 to have a frequency higher than the second clock 2ND_CLK, a speed at which data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2> are transferred through the first interface 1ST_I/F is higher than a speed at which data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2> are transferred through the second interface 2ND_I/F.

Therefore, the controller 130 may input/output data to be outputted/inputted from/to the first storage region 1501<1>, the first and second storage regions 1501<1> and 1502<1>, the first and third storage regions 1501<1> and 1501<2> or the first to third storage regions 1501<1>, 1502<1> and 1501<2>, to/from the host 102, at a relatively higher speed. Also, the controller 130 may input/output data to be outputted/inputted from/to the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>, to/from the host 102, at a relatively lower speed.

Depending on a result of checking the in-use capacity 1ST_INFO of the first interface 1ST_I/F and the in-use capacity 2ND_INFO of the second interface 2ND_I/F, the controller 130 may select whether at least one storage region to input/output data through the first interface 1ST_I/F will be the first storage region 1501<1>, the first and second storage regions 1501<1> and 1502<1>, the first and third storage regions 1501<1> and 1501<2> or the first to third storage regions 1501<1>, 1502<1> and 1501<2> and may select whether at least one storage region to input/output data through the second interface 2ND_I/F will be the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2>.

Therefore, the controller 130 may change the sizes of the physical spaces of the nonvolatile memory devices 150<1> and 150<2> which use the first interface 1ST_I/F and the sizes of the physical spaces of the nonvolatile memory devices 150<1> and 150<2> which use the second interface 2ND_I/F, depending on in-use capacities for the first to fourth storage regions 1501<1>, 1502<1>, 1501<2> and 1502<2> of the nonvolatile memory devices 150<1> and 150<2>.

As aforementioned, the first interface 1ST_I/F may transfer data at a higher speed than the second interface 2ND_I/F. Thus, in the present embodiment of the disclosure, the first interface 1ST_I/F may be implemented with a dual in-line memory module (DIMM) interface, and the second interface 2ND_I/F may be implemented with a PCI-express (peripheral component interconnect express: PCI-e) interface.

Furthermore, the controller 130 may cause the first storage region 1501<1>, the first and second storage regions 1501<1> and 1502<1>, the first and third storage regions 1501<1> and 1501<2> or the first to third storage regions 1501<1>, 1502<1> and 1501<2> which input/output data through the first interface 1ST_I/F, to operate as the main memory device of the host 102, that is, a main memory which may be implemented, for example, with a DRAM. Also, the controller 130 may cause the fourth storage region 1502<2>, the third and fourth storage regions 1501<2> and 1502<2>, the second and fourth storage regions 1502<1> and 1502<2> or the second to fourth storage regions 1502<1>, 1501<2> and 1502<2> which input/output data through the second interface 2ND_I/F, to operate as the storage of the host 102, that is, a storage device which may be implemented, for example, with a NAND flash memory.

Hence, in the memory system 110 in accordance with the second embodiment of the disclosure, by appropriately dividing the first to fourth storage regions 1501<1>, 1502<1>, 1501<2> and 1502<2> included in the two nonvolatile memory devices 150<1> and 150<2>, the two nonvolatile memory devices 150<1> and 150<2> may be used simultaneously as the main memory device of the host 102 and the storage of the host 102. Furthermore, the size of a region which is to be used as the main memory device of the host 102 and the size of a region which is to be used as the storage of the host 102 may be changeably adjusted.

Hereinbelow, descriptions will be made with reference to FIGS. 7 to 12, for a data processing system and electronic appliances including the memory system 110 described above with reference to FIGS. 1 to 6, according to various embodiments.

Figure 7:
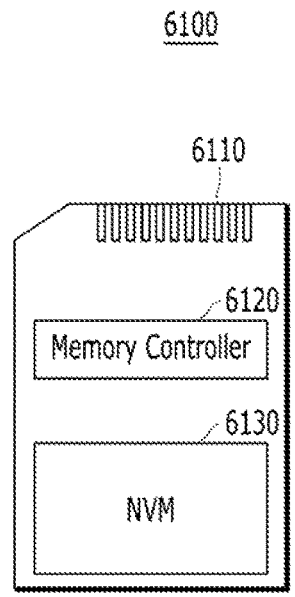
FIGS. 7 to 12 are diagrams illustrating various examples of semiconductor memory systems according to exemplary embodiments of the present invention.

FIG. 7 is illustrates a memory card system 6100.

Referring to FIG. 7, the memory card system 6100 may include a memory controller 6120, a memory device 6130, and a connector 6110.

The memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random-access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, for example, a mobile electronic appliance.

The memory device 6130 may be implemented with a nonvolatile memory (NVM). For example, the memory device 6130 may be implemented with various nonvolatile memory devices such as an electrically erasable and programmable ROM (EEPROM), a NAND flash memory, a NOR flash memory, a phase-change RAM (PRAM), a resistive RAM (RRAM), a ferroelectric RAM (FRAM), a magnetoresistive RAM (MRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid-state driver (SSD) by being integrated into a single semiconductor device. The memory controller 6120 and the memory device 6130 may construct a memory card such as a PC card (Personal Computer Memory Card International Association; PCM-CIA), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 8:
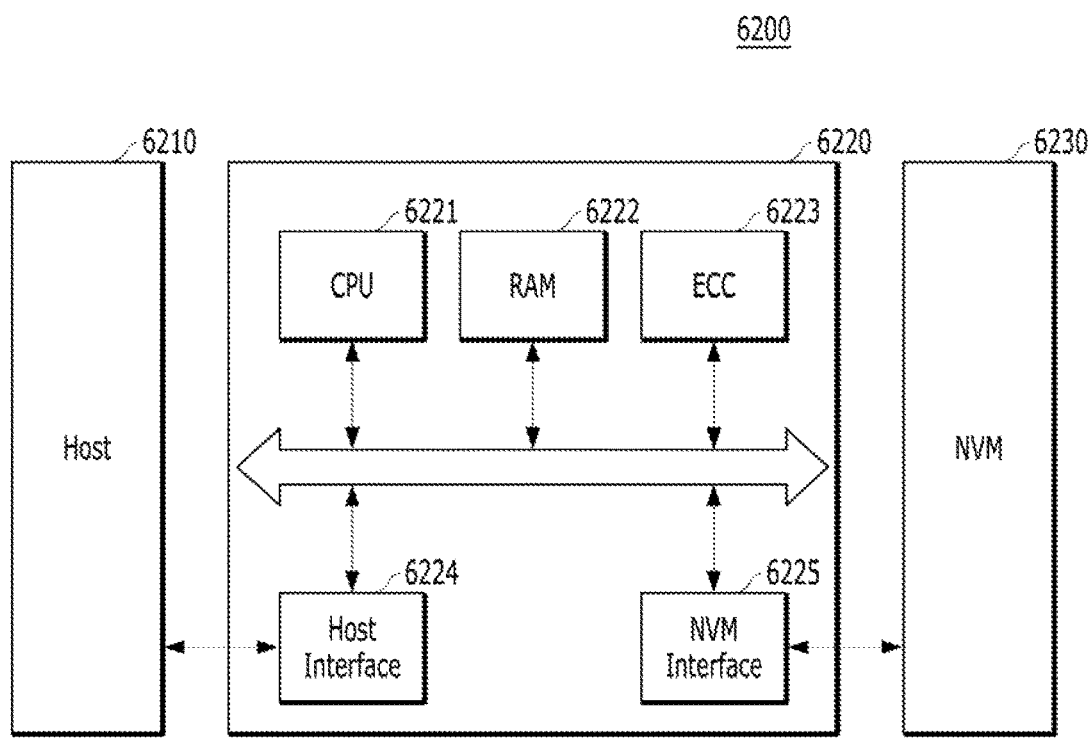

FIG. 8 is a diagram illustrating an example of a data processing system 6200 including a memory system according to an exemplary embodiment of the present invention.

Referring to FIG. 8, the data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random-access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 may be temporarily stored in the RAM 6222. In the case where the RAM 6222 is used as a buffer memory, the RAM 6222 may be used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, for example, a mobile electronic appliance.

Figure 9:
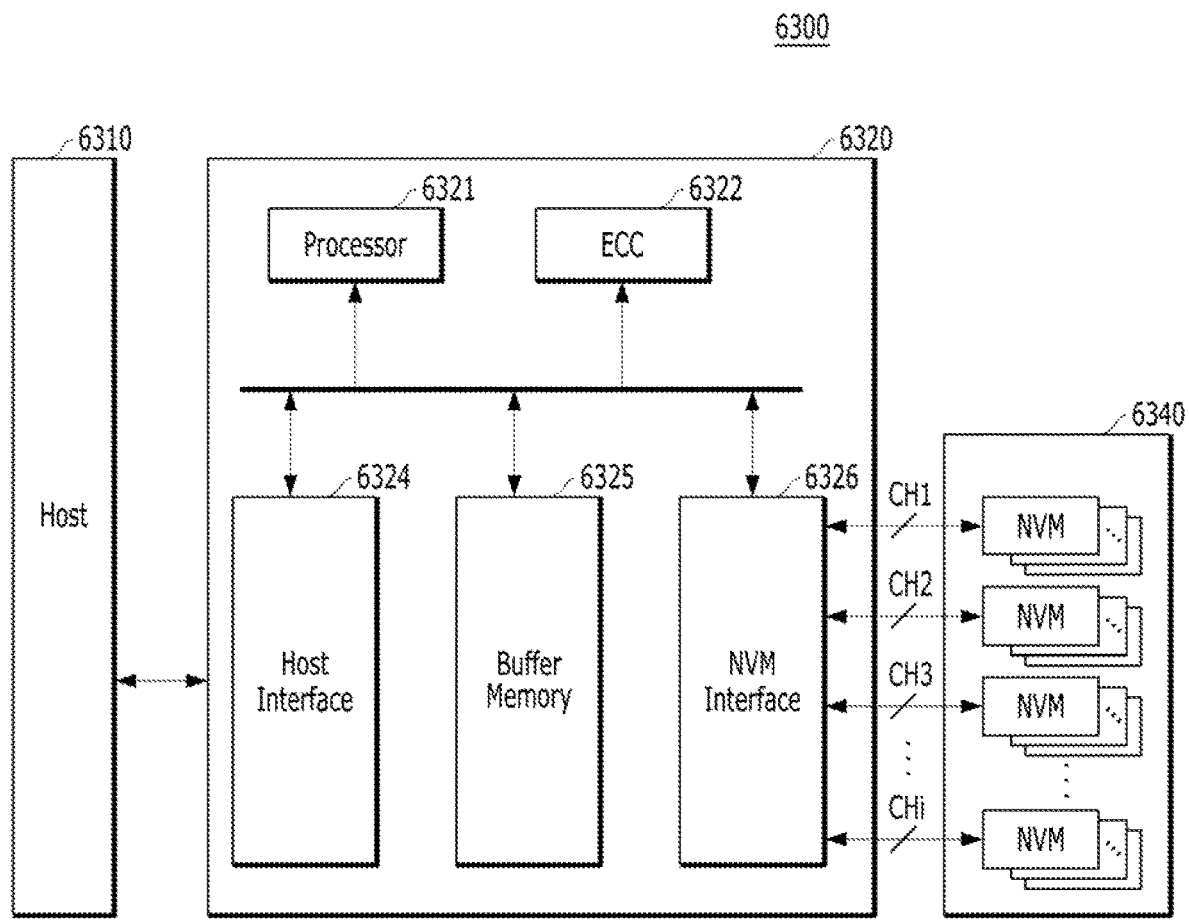

FIG. 9 is a diagram illustrating an example of a data processing system 6300 including a memory system according to an exemplary embodiment of the present invention. In FIG. 9 the data processing system may be a solid-state drive (SSD) 6300.

Referring to FIG. 9, the SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

The controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (RRAM), a magnetoresistive RAM (MRAM), a spin-transfer torque magnetic random access memory (STT-MRAM) and a phase-change random access memory (PRAM). While it is illustrated in FIG. 9, for the sake of convenience in explanation, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 10:
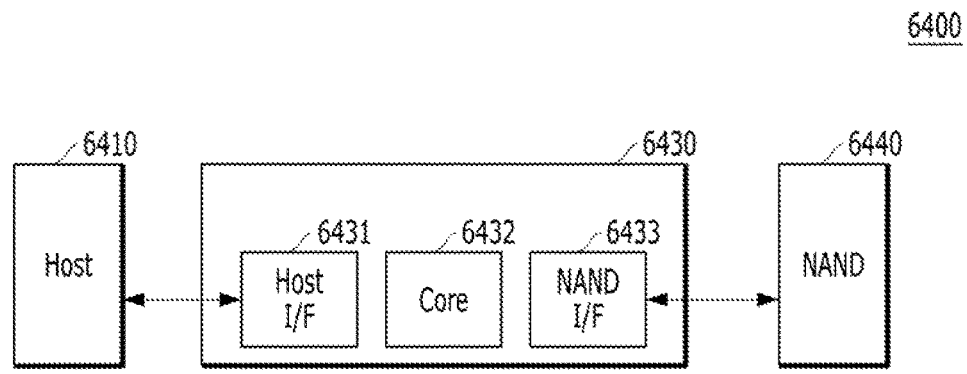

FIG. 10 is a diagram illustrating another example of a data processing system 6400 including the memory system according to an exemplary embodiment of the present inventive concept. FIG. 10 is illustrating an embedded multimedia card (eMMC) 6400 to which a memory system according to an embodiment is applied.

Referring to FIG. 10, the eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 11:
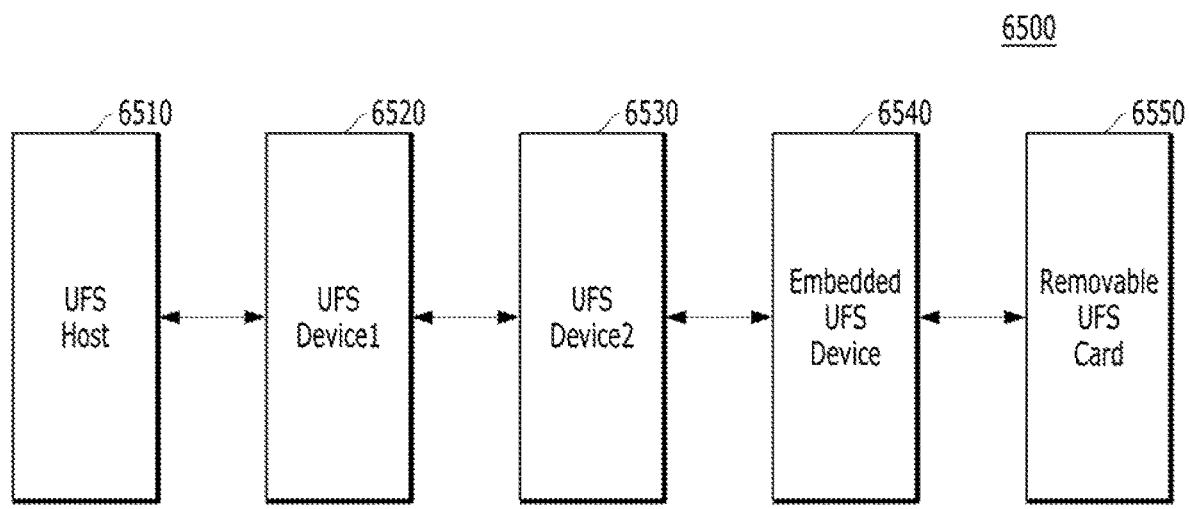

FIG. 11 is a diagram illustrating another example of a data processing system including a memory system according to an exemplary embodiment of the present invention. FIG. 11 is illustrating a universal flash storage (UFS) system 6500 according to an embodiment of the present invention.

Referring to FIG. 11, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 7. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 12:
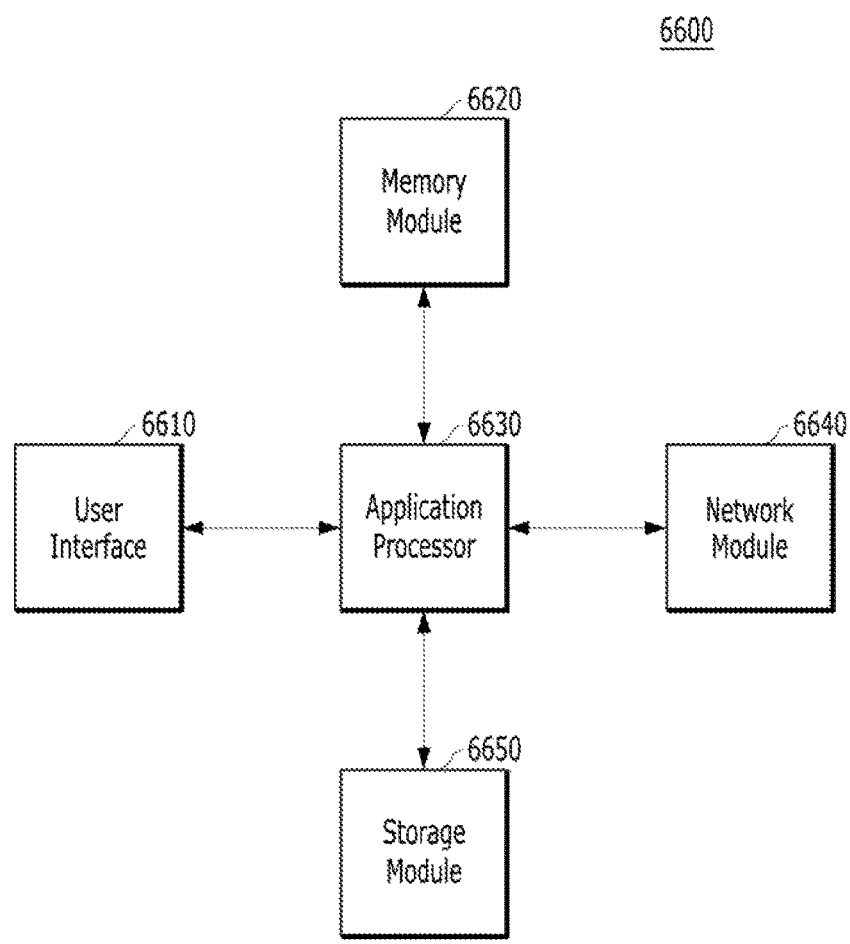

FIG. 12 is a diagram illustrating an example of a data processing system including the memory system according to an exemplary embodiment of the present invention. FIG. 12 is illustrating a user system 6600.

Referring to FIG. 12, the user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase-change random access memory (PRAM), a resistive random access memory (RRAM), a magnetoresistive RAM (MRAM), a spin transfer torque random access memory (STT-RAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), and so on, and may thereby communicate with wired/wireless electronic appliances, for example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetoresistive RAM (MRAM), a spin transfer torque random access memory (STT-RAM), a resistive RAM (RRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 9 to 11.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The present technology includes first and second interfaces for inputting/outputting data to be outputted/inputted from/to a nonvolatile memory device, to/from a host, and may control one region of the nonvolatile memory device to input/output data to/from the host by using the first interface and control the other region of the nonvolatile memory device to input/output data to/from the host by using the second interface. Through this, it is possible to achieve an effect that the nonvolatile memory device is used simultaneously for two uses.

Also, in the nonvolatile memory device, the capacity that is to be occupied by the one region and the capacity that is to be occupied by the other region may be changeably applied depending on the in-use capacities of the first and second interfaces. Through this, the lifetime of the nonvolatile memory device may be lengthened, and the uses thereof may be extended.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a nonvolatile memory device including plural blocks comprising first and second blocks; and a controller including a memory interface coupled to the nonvolatile memory device and first and second interfaces coupled to a host, the memory interface being suitable for transferring data between the controller and the first and second blocks, the first interface being suitable for exchanging data between the first blocks and the host, and the second interface being suitable for exchanging data between the second blocks and the host, wherein the controller is further suitable for checking usages of each of the first and second interfaces in a predetermined period, and allocating some of the plural blocks to the first blocks and the remainder of the plural blocks to the second blocks based on the usage of the first and second interfaces.

2. The memory system according to claim 1, wherein the controller is further suitable for changing some of the first blocks to the second blocks, vice versa, based on the usages of the first and second interfaces.

3. The memory system according to claim 2,
wherein when a first size of first data inputted/outputted through the first interface in the predetermined period is larger by at least a predetermined size than a second size of second data inputted/outputted through the second interface in the predetermined period, the controller increases the capacity of the first blocks in the nonvolatile memory device by a predetermined magnitude, and decreases the capacity of the second blocks in the nonvolatile memory device, by the predetermined magnitude,
wherein, when a first size of first data inputted/outputted through the first interface in the predetermined period is smaller by at least a predetermined size than a second size of second data inputted/outputted through the second interface in the predetermined period, the controller decreases the capacity of the first blocks in the nonvolatile memory device by a predetermined magnitude, and increases the capacity of the second blocks in the nonvolatile memory device by the predetermined magnitude, and
wherein, when a first size of first data inputted/outputted through the first interface in the predetermined period and a second size of second data inputted/outputted through the second interface in the predetermined period have a difference smaller than a predetermined size, the controller retains the capacities of the first and blocks in the nonvolatile memory device to be the same as those determined before the predetermined period is entered.

4. The memory system according to claim 2,
wherein when a first size of first data inputted/outputted through the first interface in the predetermined period is larger than a first reference size and a second size of second data inputted/outputted through the second interface in the predetermined period is smaller than a second reference size, the controller increases the capacity of the first blocks in the nonvolatile memory device by a predetermined magnitude, and decreases the capacity of the second blocks in the nonvolatile memory device, by the predetermined magnitude, and
wherein when the first size of first data inputted/outputted through the first interface in the predetermined period is smaller than the first reference size and a second size of the second data inputted/outputted through the second interface in the predetermined period is larger than the second reference size, the controller decreases the capacity of the first blocks in the nonvolatile memory device by the predetermined magnitude, and increases the capacity of the second blocks in the nonvolatile memory device by the predetermined magnitude.

5. The memory system according to claim 4,
wherein when the first size of first data inputted/outputted through the first interface in the predetermined period is larger than the first reference size and a second size of second data inputted/outputted through the second interface in the predetermined period is larger than the second reference size and in the case where the first size of the first data inputted/outputted through the first interface in the predetermined period is smaller than the first reference size and the second size of the second data inputted/outputted through the second interface in the predetermined period is smaller than the second reference size, the controller retains the capacities of the first and second blocks in the nonvolatile memory device to be the same as those determined before the predetermined period is entered.

6. The memory system according to claim 2,
wherein a length of the predetermined period corresponds to a predetermined time interval, and
wherein the controller repeatedly applies the predetermined period with a predetermined cycle from a time when power is supplied or every time a predetermined event occurs.

7. The memory system according to claim 1, wherein the controller comprises:
a clock generation unit suitable for generating a first and a second clock, the first clock having a relatively higher frequency than the second clock; and
a transfer unit suitable for inputting/outputting output/input data of the first blocks to/from the host through the first interface which operates in response to the first clock, and inputting/outputting output/input data of the second blocks to/from the host through the second interface which operates in response to the second clock.

8. The memory system according to claim 1,
wherein the controller uses the first blocks as a main memory device of the host, and uses the second blocks as a storage of the host.

9. The memory system according to claim 8,
wherein the first interface includes a dual in-line memory module (DIMM) interface, and the second interface includes a PCI-express (peripheral component interconnect express: PCI-e) interface.

10. The memory system according to claim 9,
wherein the nonvolatile memory device includes any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

11. A memory system comprising:
a first nonvolatile memory device including plural blocks comprising first blocks and second blocks;
a second nonvolatile memory device including plural blocks comprising third blocks and fourth blocks; and
a controller including a memory interface coupled to the first and second nonvolatile memory devices and first and second interfaces coupled to a host, the memory interface being suitable for transferring data between the controller and the first to forth blocks, the first interface being suitable for exchanging data between at least one blocks among the first to third blocks and the host, and the second interface being suitable for exchanging data between at least one blocks among the second to fourth blocks and host, wherein, in the second and third blocks commonly controlled by the first and second interfaces, the controller checks respective usage of the first and second interfaces in a predetermined period, and, depending on a check result, assigns the second blocks to one of the first interface and the second interface, and the third blocks to one of the first interface and the second interface.

12. The memory system according to claim 11,
wherein the controller depending on the checking result, selects whether the second blocks will input/output data by using the first interface or the second interface, and selects whether the third blocks will input/output data by using the first interface or the second interface.

13. The memory system according to claim 12,
wherein, when a size of data inputted/outputted through the first interface in the predetermined period is larger by at least a predetermined size than a size of data inputted/outputted through the second interface in the predetermined period, the controller controls at least two blocks among the first to third blocks to input/output data by using the first interface and controls at most two blocks among the second to fourth blocks to input/output data by using the second interface, wherein, when a size of data inputted/outputted through the first interface in the predetermined period is smaller by at least the predetermined size than a size of data inputted/outputted through the second interface in the predetermined period, the controller controls at most two blocks among the first to third blocks to input/output data by using the first interface and controls at least two blocks among the second to fourth blocks to input/output data by using the second interface, and wherein, when a size of data inputted/outputted through the first interface in the predetermined period and a size of data inputted/outputted through the second interface in the predetermined period have a difference smaller than the predetermined size, the controller controls the first to fourth blocks to use the first and second interfaces having been used to input/output data before the predetermined period is entered, as they are.

14. The memory system according to claim 12,
wherein, in the case where a size of data inputted/outputted through the first interface in the predetermined period is larger than a first reference size and a size of data inputted/outputted through the second interface in the predetermined period is smaller than a second reference size, the controller controls at least blocks among the first to third blocks to input/output data by using the first interface and controls at most blocks among the second to fourth blocks to input/output data by using the second interface, and wherein, in the case where a size of data inputted/outputted through the first interface in the predetermined period is smaller than the first reference size and a size of data inputted/outputted through the second interface in the predetermined period is larger than the second reference size, the controller controls at most two blocks among the first to third blocks to input/output data by using the first interface and controls at least two blocks among the second to fourth storage blocks to input/output data by using the second interface.

15. The memory system according to claim 14,
wherein, when a size of data inputted/outputted through the first interface in the predetermined period is larger than the first reference size and a size of data inputted/outputted through the second interface in the predetermined period is larger than the second reference size and in the case where a size of data inputted/outputted through the first interface in the predetermined period is smaller than the first reference size and a size of data inputted/outputted through the second interface in the predetermined period is smaller than the second reference size, the controller controls the first to fourth blocks to use the first and second interfaces having been used to input/output data before the predetermined period is entered, as they are.

16. The memory system according to claim 12,
wherein a length of the predetermined period corresponds to a predetermined time interval, and
wherein the controller repeatedly applies the predetermined period with a predetermined cycle from a time when power is supplied or every time a predetermined event occurs.

17. The memory system according to claim 11, wherein the controller comprises:
a clock generation unit suitable for generating a first clock and a second clock, the first clock having a relatively higher frequency than the second clock; and
a transfer unit suitable for inputting/outputting data to be outputted/inputted from at least one blocks among the first to third blocks, to/from the host, through the first interface which operates in response to the first clock, and inputting/outputting data to be outputted/inputted from at least one blocks among the second to fourth blocks, to/from the host, through the second interface which operates in response to the second clock.

18. The memory system according to claim 11,
wherein the controller uses at least one blocks among the first to third blocks which uses the first interface, as a main memory device of the host, and uses at least one blocks among the second to fourth blocks which uses the second interface, as a storage of the host.

19. The memory system according to claim 18,
wherein the first interface includes a dual in-line memory module (DIMM) interface, and
wherein the second interface includes a PCI-express (peripheral component interconnect express: PCI-e) interface.

20. The memory system according to claim 19,
wherein each of the first and second nonvolatile memory devices includes any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

* * * * *